United States Patent
Ai et al.

(10) Patent No.: US 8,457,391 B2
(45) Date of Patent: Jun. 4, 2013

(54) DETECTING DEVICE FOR SPECIFIC SUBJECTS AND LEARNING DEVICE AND LEARNING METHOD THEREOF

(75) Inventors: Haizhou Ai, Beijing (CN); Chang Huang, Beijing (CN); Shihong Lao, Kyoto (JP); Takayoshi Yamashita, Kyoto (JP)

(73) Assignees: Tsinghua University, Beijing (CN); Omron Corporation, Kyoto (JP)

( * ) Notice: Subject to any disclaimer, the term of this patent is extended or adjusted under 35 U.S.C. 154(b) by 529 days.

(21) Appl. No.: 12/602,635

(22) PCT Filed: May 30, 2008

(86) PCT No.: PCT/CN2008/071156
§ 371 (c)(1),
(2), (4) Date: Apr. 7, 2010

(87) PCT Pub. No.: WO2008/148343
PCT Pub. Date: Dec. 11, 2008

(65) Prior Publication Data
US 2010/0202681 A1    Aug. 12, 2010

(30) Foreign Application Priority Data
Jun. 1, 2007    (CN) .......................... 2007 1 0109876

(51) Int. Cl.
*G06K 9/62* (2006.01)
*G06K 9/54* (2006.01)
(52) U.S. Cl.
USPC ............................ 382/159; 382/224; 382/305
(58) Field of Classification Search
USPC ................. 382/159, 195, 103, 128, 115–118, 382/155, 162, 168, 173, 181, 190, 191, 199, 382/203, 224, 226, 225, 232, 254, 276, 305; 345/589, 505–506; 712/10; 386/4
See application file for complete search history.

(56) References Cited

U.S. PATENT DOCUMENTS 7,202,873 B2 *    4/2007    Akahori .................... 345/589
(Continued)

FOREIGN PATENT DOCUMENTS

CN    1438604 A    8/2003
(Continued)

OTHER PUBLICATIONS

Wangyubo, et al, "Real-Time Facial Expression Classification", *Journal of Computer-Aided Design and Computer Graphics*, vol. 17, No. 6, Jun. 2005, pp. 1296-1301.
(Continued)

*Primary Examiner* — Sheela Chawan
(74) *Attorney, Agent, or Firm* — Dickstein Shapiro LLP

(57) ABSTRACT

The invention discloses a detecting device for specific subjects and a learning device and method thereof. The detecting device for specific subjects includes an input unit, one or more strong classifying units, a storage unit and a judging unit, wherein the input unit is used for inputting images to be detected; the strong classifying units are used for carrying out strong classification to the image, each strong classifying unit includes one or more weak classifying units, and the weak classifying unit carries out weak classification to the image with a weak classifying template; the storage unit stores the weak classifying template used by the weak classifying unit; and the judging unit judges whether or not the image contains specific subjects according to the classification result of the strong classifying unit. The detecting device for specific subjects also includes an incremental sample input unit and a learning unit, wherein the incremental sample input unit is used for inputting data for incremental learning, namely for inputting an incremental learning sample, which is data undetected and wrongly detected by the detecting device or other detecting devices for specific subjects; the learning unit is used for updating the weak classifying template stored in the storage unit according to the incremental learning sample inputted by the incremental sample input unit.

27 Claims, 16 Drawing Sheets

U.S. PATENT DOCUMENTS

| | | |
|---|---|---|
| 2005/0069278 A1 | 3/2005 | Akahori |
| 2009/0041357 A1* | 2/2009 | Yonezawa et al. ............ 382/195 |

FOREIGN PATENT DOCUMENTS

| | | |
|---|---|---|
| CN | 1731417 A | 2/2006 |
| JP | 2005-115525 A | 4/2005 |
| JP | 2005-122720 A | 5/2005 |
| JP | 2007-4721 A | 1/2007 |
| JP | 2007-34723 A | 2/2007 |
| WO | WO 01/09821 A1 | 2/2001 |

OTHER PUBLICATIONS

Li Xu et al., "Online Real Boosting for Object Tracking Under Severe Appearance Changes and Occlusion", Acoustics, Speech and Signal Processing, 2007, IEEE International Conference, Apr. 15, 2007, pp. I-925-I-928.

* cited by examiner

FIG. 2

INITIAL CONDITIONS: FOR ALL OF $m \in \{1, 2, \cdots, M\}$, $\lambda_m^{sc} = \lambda_m^{sw} = 0$ 1. (INPUT)
   - CURRENT ONLINE TRAINING SAMPLE $(x, y)$
   - ONLINE WEAK CLASSIFIER LEARNING ALGORITHM $L_O$
   - STRONG CLASSIFIER $\mathbf{h}$ 2. (INITIATE)
   - WEIGHT OF CURRENT ONLINE TRAINING SAMPLE, $\lambda = 1$ 3. (ONLINE TRAINING PROCESS)
   - FOR $i = 1, \cdots, M$
     - SET PARAMETER $k$ IN ACCORDANCE WITH $Poisson(\lambda)$ USING $\lambda$ AS PARAMETER
     - TRAIN WEAK CLASSIFIER $h_m$ FOR $k$ TIMES IN ACCORDANCE WITH TRAINING SAMPLE $(x, y)$ $$h_m \leftarrow L_O(h_m, (x, y))$$

- IF $y = h_m(x)$ (NAMELY THAT SAMPLES ARE CORRECTLY CLASSIFIED)

$$\diamond \quad \lambda_m^{sc} \leftarrow \lambda_m^{sc} + \lambda, \quad e_m \leftarrow \lambda_m^{sw} / (\lambda_m^{sc} + \lambda_m^{sw}), \quad \lambda \leftarrow \lambda \times \frac{1}{2(1 - e_m)}$$

- OTHERWISE $$\diamond \quad \lambda_m^{sw} \leftarrow \lambda_m^{sw} + \lambda, \quad e_m \leftarrow \lambda_m^{sw} / (\lambda_m^{sc} + \lambda_m^{sw}), \quad \lambda \leftarrow \lambda \times \frac{1}{2 e_m}$$

4. (OUTPUT)
   - UPDATED STRONG CLASSIFIER $\mathbf{h}(x) = \arg\max_{c \in Y} \sum_{m=1}^{M} \log \frac{1 - e_m}{e_m} [\![ h_m(x) = c ]\!]$ (a) WATERFALL MODEL   (b) VECTOR TREE MODEL

FIG. 16

1.1 SELECT SUITABLE ONLINE SAMPLE REINFORCE RATIOS $\lambda_{+1}$ AND $\lambda_{-1}$ (SUCH AS BETWEEN 10 AND 100)
1.2 PROVIDE EXISTING DETECTOR $C = \{F_1,...,F_M\}$, WHEREIN $F_i$ REPRESENTS STRONG CLASSIFIER IN $i^{TH}$ LAYER.
1.3 INITIATE ONLINE TRAINING SAMPLE SET, $S_0 = S_o$.
1.4 FOR $i=1,\cdots,M$ (FOR EACH STRONG CLASSIFIER IN WATERFALL MODEL FROM TOP TO BOTTOM)
1.4.1 ACCORDING TO $\lambda_{+1}$ AND $\lambda_{-1}$, USE $S_{i-1}$ TO CARRY OUT INCREMENTAL LEARNING TO ORIGINAL STRONG CLASSIFIER $F_i(x:c)$, AND OBTAIN ADJUSTED STRONG CLASSIFIER $F_i^*(x:c+\Delta c^*)$, WHEREIN HYBRID OBJECTIVE LOSS FUNCTION $\tilde{L}(p(x,y),c+\Delta c^*)$ IS MINIMIZED BY INTRODUCING LOOKUP TABLE ADJUSTMENT VALUE $\Delta c^*$, MORE SPECIFICALLY, OPTIMIZATION PROCESS CAN BE COMPLETED BY USING METHOD OF STEEPEST DESCENT.
AS SHOWN AS FOLLOWS:
- INITIATE $\Delta c \leftarrow 0$
- CALCULATE GRADIENT $g \leftarrow \frac{\partial \tilde{L}(p(x,y),c+\Delta c)}{\partial \Delta c}$ OF HYBRID OBJECTIVE LOSS FUNCTION
- WHILE MODULE OF GRADIENT IS NOT VERY LESS, NAMELY $\|g\|_2 > \varepsilon$ ($\varepsilon$ IS A SMALL POSITIVE NUMBER SUCH AS $\varepsilon = 10^{-4}$)
- USE 0.618 METHOD TO OPTIMIZE AND OBTAIN A LINEAR COMBINATION COEFFICIENT $\alpha^* \in \mathbb{R}$ TO MAKE IT OPTIMIZE HYBRID OBJECTIVE LOSS FUNCTION $\tilde{L}(p(x,y),c+\Delta c+\alpha^* \cdot g)$
- UPDATE LOOKUP TABLE ADJUSTMENT VALUE $\Delta c \leftarrow \Delta c + \alpha^* \cdot g$ IN ACCORDANCE WITH LINEAR COMBINATION COEFFICIENT
- RECALCULATE GRADIENT $g \leftarrow \frac{\partial \tilde{L}(p(x,y),c+\Delta c)}{\partial \Delta c}$ OF HYBRID OBJECTIVE LOSS FUNCTION
- END WHILE 1.4.2 REMOVE SAMPLES WHICH DO NOT PASS THROUGH NEW STRONG CLASSIFIER $F_i^*(x:c+\Delta c^*)$ IN ONLINE SAMPLE SET $S_{i-1}$ TO FORM A NEW ONLINE TRAINING SAMPLE SET $S_i$, NAMELY $$S_i = \{(x_i,y_i)|(x_i,y_i) \in S_{i-1} \wedge F_i^*(x_i) < b_i\}$$

WHEREIN $b_i$ REPRESENTS CORRESPONDING DETERMINATION THRESHOLD OF STRONG CLASSIFIER IN $i^{TH}$ LAYER: $F_i^*(x_i) < b_i$ MEANS THAT INSTANCE $x_i$ IS REGARDED AS NONFACE MODE AND REMOVED BY STRONG CLASSIFIER.

1.5 OBTAIN WATERFALL TYPE DETECTOR $C^* = \{F_1^*,...,F_M^*\}$ AFTER INCREMENTAL LEARNING

DETECTING DEVICE FOR SPECIFIC SUBJECTS AND LEARNING DEVICE AND LEARNING METHOD THEREOF

TECHNICAL FIELD

The invention relates to a detecting device for specific subjects and a learning device and a learning method thereof, more specifically, to a learning device and a learning method for learning and training a strong classifier and a weak classifier, and a detecting device for specific subjects, which uses the learning device and the learning method.

BACKGROUND ART

Face detection means searching any given image to determine whether or not the image contains a face by a certain method and returning the position, size and posture of the face if the result is positive. The face usually has rich biologic feature information which can be used in the fields of human-machine interaction, tracking monitoring, identity identification, or the like. The primary step to extract associated information of the face is to localize the area of the face. It causes the technique of face detection to have unusual significance and a wide application prospect. The practicability of face detection will depend on the increase of detection precision and detection speed.

FIG. 1 shows a block diagram of the functional structure of a detector in the related art. As shown in FIG. 1, the hierarchical structure of the detector in the related art includes a detector, strong classifiers, weak classifiers, feature extraction parts and function mapping parts in turn from top to bottom. That is to say the detector in the related art includes a plurality of strong classifiers which are series connected each other, each strong classifier includes a plurality of weak classifiers which are series connected each other, and each weak classifier includes a feature extraction part and a mapping part. The feature extraction parts adopt feature extraction methods such as sparse granularity features, etc. to carry out feature extraction (refer to Chinese patent application No. 200610072576.4 of the patent applicant, and merge it into the present application just as it has been described in the present application), and the mapping parts adopt methods such as piecewise linear function based on a lookup table, etc. to carry out weak classification.

The detector needs to be trained before being used. It is well known that in the field fixed offline training is carried out to the detector. For the fixed offline training algorithm, once the sample set for training (namely face pictures and background pictures) is determined, the face detector obtained by learning can not be changed greatly. Because of the limitation of the collection process of offline training samples, the sample set only can describe the distribution condition of the face mode and the non-face mode under general environmental conditions usually. However, because of different terminal users and the change of environment and objectives, the detector often encounters some special conditions. On one hand, wearing decorative articles such as sunglasses, scarves, etc. can result in partial shielding of the face, and acute change of illumination even greatly changes the apparent mode of the face. Because the face mode in special environment is unusual, it seldom exists in the face sample set for offline training. On the other hand, although we can collect the set of many background pictures and extract a large quantity of scanning windows as non-face training samples, we can not make sure that all background types are contained. In other words, there is a larger difference between general conditions described by the offline training sample set (including the face part and the non-face part) and actual conditions to be treated by online detection. The unavoidable difference makes the detector obtained by offline training can not frequently adapt to the application environment of online detection well, so a large quantity of undetection and wrong detection is generated.

In the final analysis, the inadaptability is caused by the method that the offline training samples can not reflect online conditions. In order to overcome the problem, people carry out a large quantity of research to online learning.

Online learning is a persistent learning algorithm specially designed in accordance with the collection characteristics of training data. The online learning process needs to process continuously collected data flow, which is different from the offline learning process that all training data are collected in advance. Because the total data quantity is very large, online learning can not store all the collected data. In other words, each training datum must be abandoned after been used. Online learning need not use the result obtained by offline training as basis, so it is a simple learning framework.

Up to now, most work related to online learning is based on traditional machine learning methods, such as the online learning algorithm which is proposed by P. Utgoff, etc. and based on a decision tree model, the Winnow algorithm proposed by N. Littlestone and the weighted majority algorithm adopted by N. Littlestone and M. Warmuth. In the related art, the Boosting algorithm came into the world at the beginning of 1990s last century, which only takes more than ten years until now, so the Boosting algorithm is a very young machine learning algorithm. Therefore, online learning research related to it is less. L. Breiman introduces a "block" online Boosting algorithm in his article to divide the online training sample set into a plurality of subsets in the same size, and uses the subsets for online training of each weak classifier in turn. A. Fern and R. Givan provide another online Boosting algorithm based on the Arc-4x method, and each weak classifier is relearned by increasing the weight of wrongly divided training samples. The most representative algorithm of the relevant work is the online Boosting algorithm which is proposed by N. Oza, etc. and based on the discrete AdaBoostM1 algorithm, and the flow is shown in FIG. 2.

The algorithm uses the current latest training sample to retrain each weak classifier in the strong classifiers and the corresponding combination coefficients in turn from front to back. It adopts the decision tree model as the structure of the weak classifier, and a random number k which meets the Poisson distribution is generated in accordance with the current sample weight (namely the wrongly divided degree) as times for using the current sample to retrain the weak classifier. If the training result makes the weak classifier correctly classify the current sample, the weight of the current sample is aggregated to the correct classification times $\lambda^{sc}_m$ of the weak classifier, the error rate $e_m$ of the weak classifier is adjusted, and the weight $\lambda$ of the current sample is updated in accordance with the error rate; otherwise, the weight of the current sample is aggregated to the misclassification times $\lambda^{sw}_m$ of the weak classifier, similarly, the error rate $e_m$ of the weak classifier is also adjusted, and the weight $\lambda$ of the current sample is updated. It is clear that the online Boosting algorithm proposed by N. Oza, etc. obeys the AdaBoost.M1 algorithm in the flow structure, and is the corresponding online training version of the AdaBoost.M1 algorithm.

On the basis of the online Boosting algorithm proposed by N. Oza, etc., O. Javed, H. Grabner, etc. respectively presents respective online Boosting systems for solving many actual problems of computer vision. The online Boosting algorithm proposed by O. Javed, etc. is combined with the co-training framework to increase the performance of detecting systems for pedestrians and vehicles. And H. Grabner, etc. widely use the online Boosting algorithm for various problems of calculation vision, including background modeling and object detection and tracking by introducing a feature selecting system.

However, all of the online Boosting algorithms adopt the weak classifier form of two-value output and correspond to the traditional discrete AdaBoost algorithm. At present, there is not online learning Boosting algorithm against the continuous AdaBoost algorithm.

The online learning algorithm can properly adjust the current detector to make it process special conditions represented by the samples better, such as shielding and illumination change which are mentioned above.

However, under the condition of limited capability and capacity, if the detector wants to have better capability for processing specific scenes, it usually loses some capability for processing general environment. Even more, if the adjustment process of the detector excessively depends on online samples, the effect of incremental learning may be greatly reduced that not only the performance under general application conditions is obviously reduced, but also the phenomenon of excessive training may occur even in special environment. Thus, at present, a detector training method which can solve the problem of insufficient offline training samples without greatly reducing the performance of the detector is needed. In addition, a detector training algorithm against the continuous AdaBoost algorithm is also needed.

DISCLOSURE OF THE INVENTION

Thus, one object of the invention is to provide a detecting device for specific subjects and detecting method thereof, which can make up the deficiency of an offline training sample by using an incremental learning method, without reducing the performance of the detector by a big margin.

According to one aspect of the invention, the invention provides a detecting device for specific subjects. The detecting device for specific subjects includes an input unit for inputting images to be detected; one or more strong classifying units for carrying out strong classification to the image, wherein each strong classifying unit includes one or more weak classifying units for carrying out weak classification to the image; a storage unit for storing the weak classifying template which is used by the weak classifying unit; and a judging unit judging whether or not the image contains specific subjects according to the classification result of the strong classifying unit. The invention is characterized in that the detecting device for specific subjects also includes an incremental sample input unit and a learning unit, wherein the incremental sample input unit is used for inputting data for incremental learning, namely for inputting an incremental learning sample, which is the undetected and wrongly detected data of the detecting device or other detecting devices for specific subjects; the learning unit is used for updating the weak classifying template stored in the storage unit according to the incremental learning sample inputted by the incremental sample input unit.

According to another aspect of the invention, the invention provides a learning device for the detecting device for specific subjects. The detecting device for specific subjects includes one or more strong classifying units, each of which includes one or more weak classifying units, wherein the weak classifying unit judges whether or not the input image contains specific subjects by using a weak classifying template, the learning device updates the weak classifying template by using the incremental learning sample which is undetected and wrongly detected data of the detecting device or other detecting devices for specific subjects in operation. The learning device includes an optimum degree calculating part for calculating an optimum degree of optimization of the weak classifying template with an optimization parameter according to the input incremental learning sample; a judging unit judging whether or not the optimization of the weak classifying template with the optimization parameter meets a certain condition according to the calculation result of the optimum degree calculating part; an optimization parameter updating unit which updates the optimization parameter when the judging unit judges that the optimization of the weak classifying template with the optimization parameter does not meet a certain condition; and a template updating unit which updates the weak classifying template when the judging unit judges that the optimization of the weak classifying template with the optimization parameter meets a certain condition.

According to the third aspect of the invention, the invention provides a learning method for the detecting device for specific subjects. The detecting device for specific subjects includes one or more strong classifying units. The strong classifying unit includes one or more weak classifying units. The weak classifying unit judges whether or not the input image contains specific subjects by using the weak classifying template. The learning method includes an input step, in which the incremental learning sample which is undetected and wrongly detected data of the detecting device or other detecting devices for specific subjects in operation is inputted; an optimum degree obtaining step for calculating an optimum degree of optimization of the weak classifying template with an optimization parameter according to the input incremental learning sample; a judging step for judging whether or not the optimization of the weak classifying template with the optimization parameter meets a certain condition by using the calculation result of the optimum degree obtaining step; an optimization parameter updating step which updates the optimization parameter when the judging step judges that the optimization of the weak classifying template with the optimization parameter does not meet a certain condition; and a template updating step which updates the weak classifying template when the judging step judges that the optimization of the weak classifying template with the optimization parameter meets a certain condition.

It should be paid attention to that, both the general description above and the detailed description below are illustrational, and aim at interpreting the invention. They do not limit the protective range of the invention.

BRIEF DESCRIPTION OF THE DRAWINGS

The embodiment of the invention will be described in detail with reference to the accompanying drawing. In the drawings:

FIG. 2 shows a flow of the online Boosting algorithm in the related art.

FIG. 16 shows a flow diagram of the incremental learning method of the invention in the mode of character description.

BEST MODE FOR CARRYING OUT THE INVENTION

Figure 1:
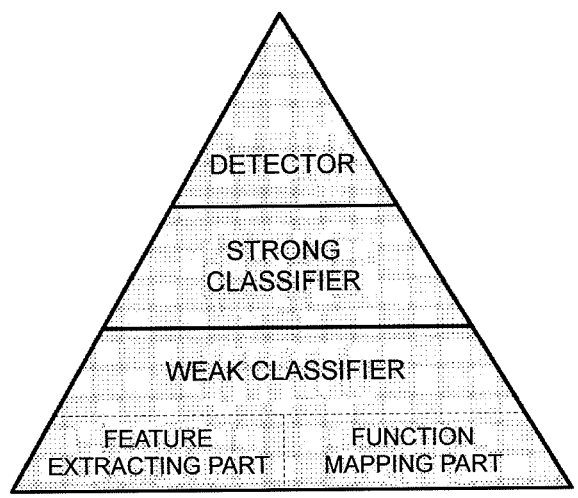
FIG. 1 shows a block diagram of the functional structure of the detector in the related art.
Figure 3:
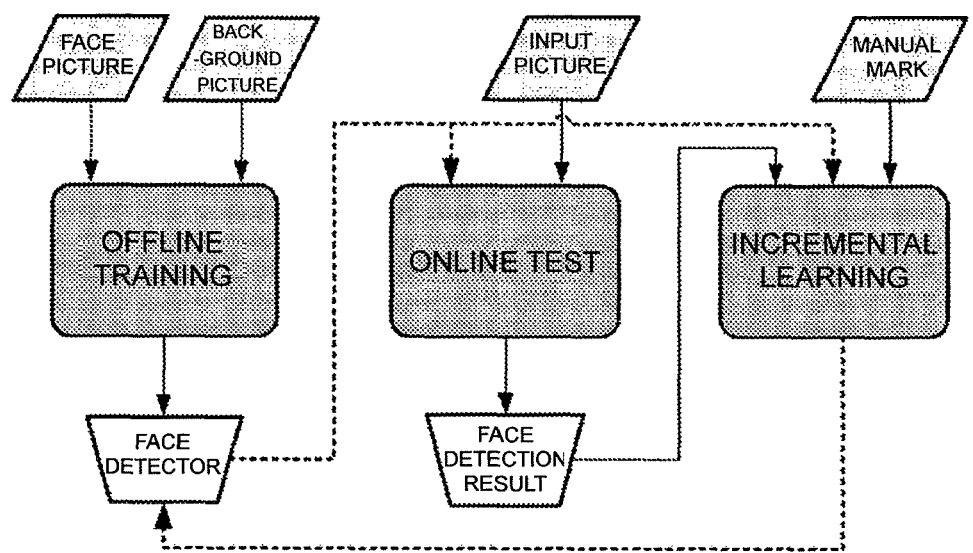
FIG. 3 shows a position of incremental learning in the framework of face detection.

The embodiments of present invention will now be described in detail with reference to the accompanying drawings. The invention adopts an incremental learning method. FIG. 3 shows the position of incremental learning in the framework of face detection. As shown in FIG. 3, incremental learning plays a role of "beneficial supplement of offline training" in the whole framework of face detection. Because training samples ("face pictures" and "background pictures") which are adopted in the offline training process can not cover all of the application conditions, undetection and wrong detection frequently occur in the actual online detection process. Especially, under some special environmental conditions (such as bad illumination, obvious shielding on the face, etc.), satisfactory detection precision often can not be achieved with the detector obtained by offline training. Therefore, the present application provides the incremental learning method which uses undetection and wrong detection collected by terminal users in the online detection process to rapidly and effectively adjust the current face detector to make it adapt to the special application environment better; simultaneously, the original performance of favorable popularization of the detector is kept, and the detector can still be used for solving the face detection problem under general conditions. The incremental learning process of the detector, which is different from the long offline learning process, only needs to consume a few calculating resources of terminal users (including two aspects: calculating time and storage space), so it can be widely applied to various platforms and equipment for face detection.

It should be noted that although the present application takes face detection as an example to describe a detecting method and a detecting device for specific subjects, the specific subjects of the invention can also be subjects other than a face, such as automobiles, specific animals, etc.

Figure 4:
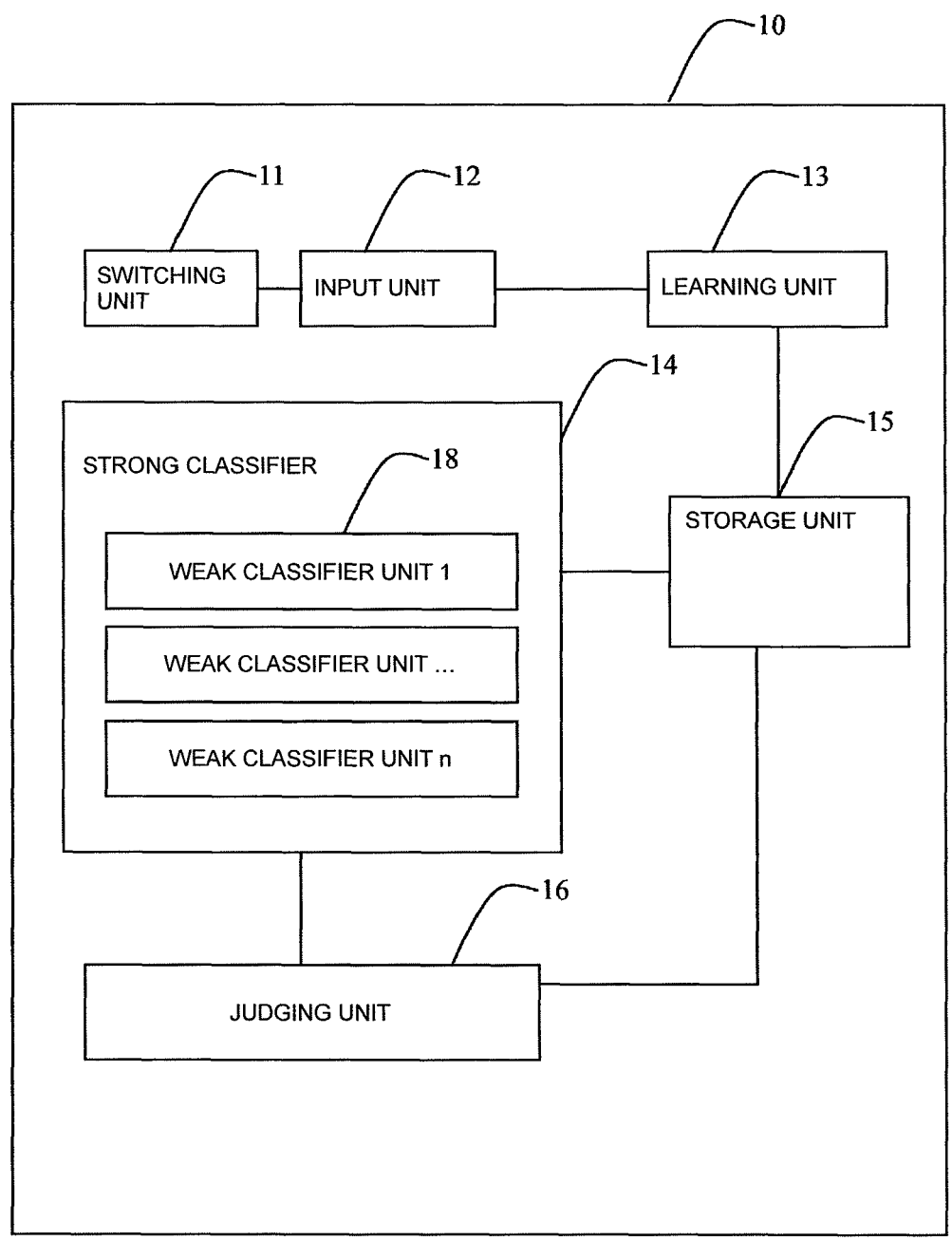
FIG. 4 shows a functional block diagram of a detecting device 10 for specific subjects in accordance with one embodiment of the invention.

FIG. 4 shows a functional block diagram of the detecting device 10 for specific subjects in accordance with one embodiment of the invention. As shown in FIG. 4, the detecting device 10 for specific subjects (also called face detector for convenient understanding in the following text) in accordance with one embodiment of the invention includes a switching unit (switching device) 11 for switching the mode state of the detecting device for specific subjects to make the detecting device for specific subjects switched between the detection mode and the learning mode; an input unit 12 for inputting images to be detected when the mode state of the detecting device 10 for specific subjects is switched to the detection mode by the switching unit 11 and inputting data for incremental learning when the mode state of the detecting device 10 for specific subjects is switched to the learning mode by the switching unit 11, namely inputting incremental learning samples (the input unit is also called incremental sample input unit at this time); one or more strong classifying units 14 for carrying out strong classification to the images, wherein each of the strong classifying units includes one or more weak classifying units 18 for weak classification to the images; a storage unit 15 for storing weak classifying templates used by the weak classifiers 18 and/or strong classifying templates used by the strong classifiers 14; a judging unit 16 for judging whether or not the images contain the specific subjects in accordance with the classification result of the strong classifying units; and a learning unit 13 for updating the templates stored by the storage unit in accordance with the incremental learning samples inputted by the incremental sample input unit 12 when the mode of the detecting device 10 for specific subjects is switched to the learning mode by the switching unit 11. For concision purposes, only one strong classifier is shown in drawings.

It should be noted that in the block diagram shown in FIG. 4, the learning unit is merged into the detecting device (detector) 10 as one module of the detecting device, but in another embodiment, the learning unit can also be separated from other modules of the detecting device 10. Under the condition, incremental learning can be carried out when the learning module is connected with the detecting device 10, and the switching unit 11 can be omitted at this time.

In addition, according to the context of the present application, the "images to be detected" can mean integral images to be distinguished or images or image blocks which have been preprocessed by the detector (such as window processing, etc.) and will be processed by the weak classifiers then.

In the invention, the incremental learning samples are a small amount of undetection and wrong detection collected by users. The undetection and wrong detection come from the detecting device itself or from other detecting devices which are the same as the detecting device. Under the condition that the undetection and wrong detection come from the detecting device itself, the incremental sample input unit can include a record unit for recording images which are undetected or wrongly detected by the detector in operation. Under the condition that the undetection and wrong detection come from other detecting devices, the detecting device can receive the data through network (such as internet, intranet, local net, etc.) or receive the undetection and wrong detection through media such as disks, CD, VCD, DVD, flash memories, or the like. Under this condition, the incremental sample input unit includes a receiving unit for receiving images which are undetected or wrongly detected by the other detecting devices in operation. It is clear that the input unit can include the register unit and the receiving unit.

Figure 5:
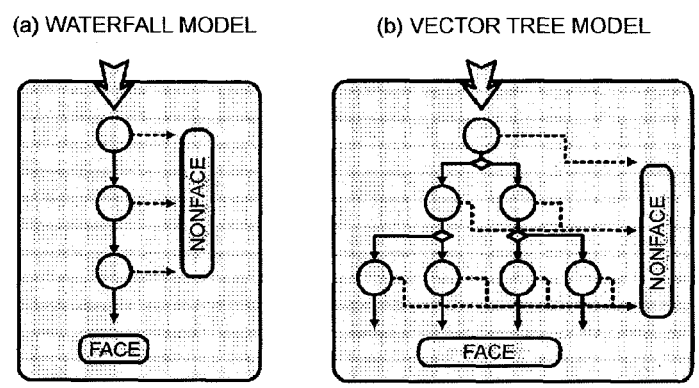
FIG. 5 shows a schematic diagram of the connection of strong classifying units in the waterfall mode and the vector tree mode.

In the invention, one or more strong classifying units can be connected in the waterfall mode or in the vector tree mode. FIG. 5 shows a schematic diagram of the connection of the strong classifying units in the waterfall mode and in the vector tree mode. Therefore, according to the context, updating and training of the strong classifying units maybe means to update and train the weak classifying units which form the strong classifying units. In addition, according to the context, the description of the strong classifying units may be the description of the weak classifying units. In such a context, the description will not result in confusion or misunderstanding of technicians in the field.

Figure 6:
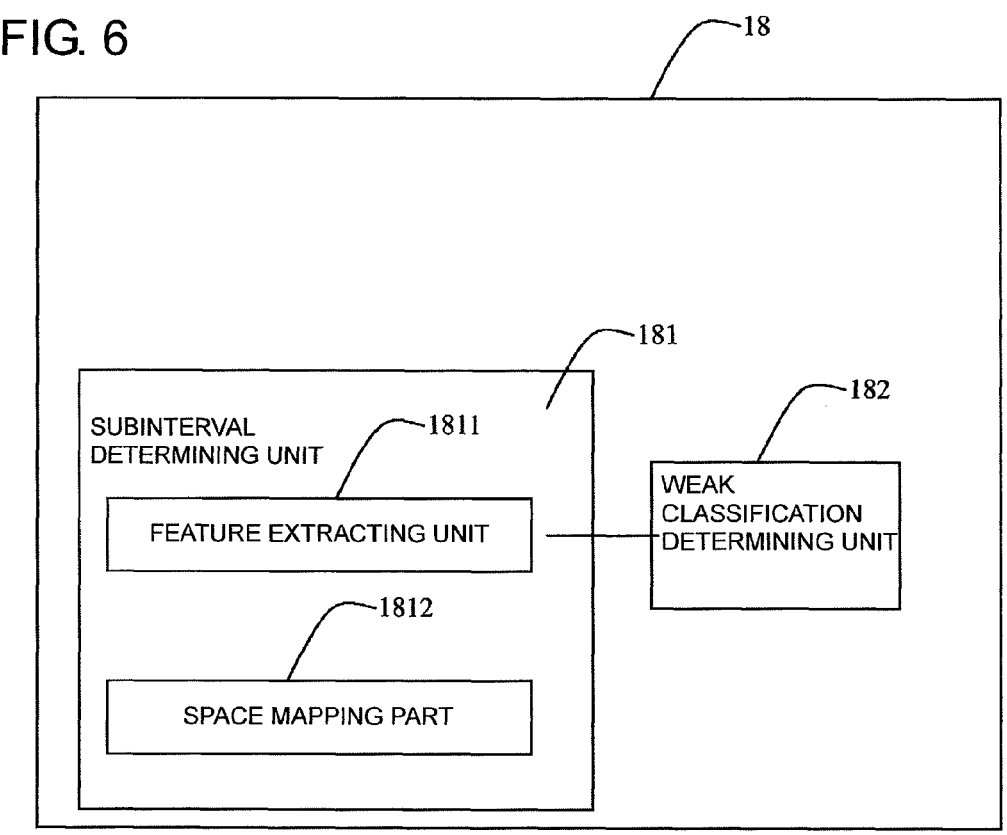
FIG. 6 shows a functional block diagram of weak classifying units.

FIG. 6 shows a functional block diagram of the weak classifying units 18. As shown in FIG. 6, each of the weak classifying units 18 includes a subinterval judging unit 181 for dividing input samples into one of a series of subintervals which are not crossed mutually in an instance space; and a weak classification determining unit 182 for carrying out weak classification to the samples in accordance with the judging result of the subinterval judging unit and subinterval weak classifying templates. The subinterval judging unit 181 includes a feature extracting unit 1811 and a space mapping part 1812. Preferably, the feature extracting unit 1811 extracts sparse granularity features or other features of input objects, and the space mapping part 1812 maps the input objects to a plurality of subintervals which are not crossed mutually and are divided by the embodiment space by using the piecewise linear function in accordance with the features extracted by the feature extracting unit 1811. Certainly, other functions other than the piecewise linear function can also be adopted if the other functions meet the requirement of domain partition of the weak classifiers in the embodiment, namely that in the invention, the combination of the above sparse granularity features with the piecewise linear function is only taken as an example. The weak classification determining unit 182 is used for weak classification to the input objects by using the subinterval weak classifying templates in accordance with the judging result of the subinterval judging unit 181. The following text will describe the operation of the weak classifiers in detail.

The storage unit 15 stores the subinterval weak classifying templates; the learning unit 13 updates all of the subinterval weak classifying templates stored by the storage unit in accordance with the incremental learning samples inputted by the input unit 12.

In the invention, the subinterval weak classifying templates can be two-dimensional tables (classification tables), functions, etc., and can adopt various forms which are well known by technicians in the field provided that the weak classifying templates are used for classifying the objects to be detected in accordance with the mapping result (indices, names, etc. of the subintervals) of the space mapping part 1812.

Figure 7:
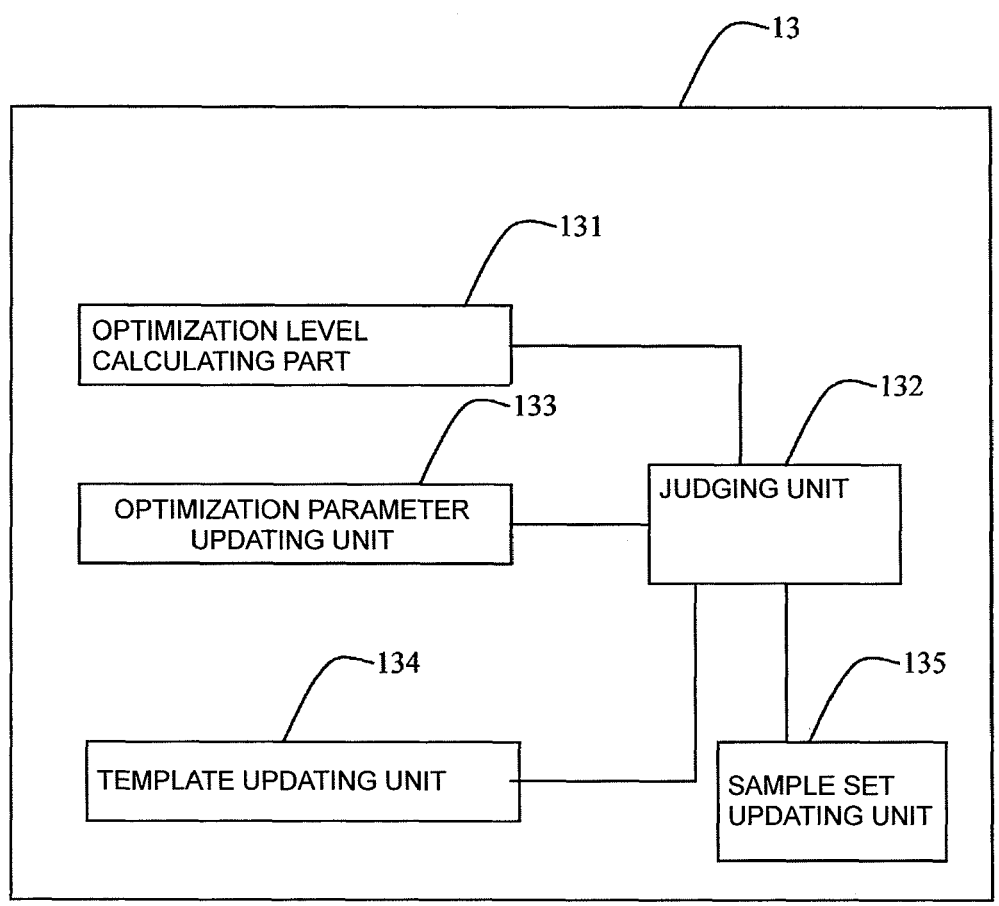
FIG. 7 shows a functional block diagram of the learning unit in accordance with one embodiment of the invention.

FIG. 7 shows a functional block diagram of the learning unit in accordance with one embodiment of the invention. As shown in FIG. 7, the learning unit 13 in accordance with one embodiment of the invention includes an optimization level calculating part 131, a judging unit 132, an optimization parameter updating unit 133, a template updating unit 134 and an incremental learning sample set updating unit 135, wherein the optimization level calculating part 131 is used for calculating the optimization level by using an optimization parameter to optimize the weak classifying templates in accordance with the input incremental learning samples. As described in the following text, in fact, the learning process of the learning unit is a process of obtaining the optimum optimization parameter ($\Delta c$) in accordance with the incremental learning samples. The process is a process of continuously obtaining the optimization parameter and judging the suitability of the optimization parameter. At the beginning of the process, the initial optimization parameter can be randomly set (for instance, $\Delta c$ is set to 0). The process can be realized by adopting the following method of steepest descent or other methods. There are many algorithms to replace the method of steepest descent, such as the Newton method and the quasi-Newton method. The optimization level can be the gradient of the following objective loss function. The optimization parameter corresponds to the template adjustment value, namely the lookup table adjustment value described in the following text.

According to the calculating result of the optimization level calculating part, the judging unit 132 judges whether or not the optimization of the weak classifying templates (such as the subinterval weak classifying templates) with the optimization parameter meets a certain condition (for instance whether or not the gradient is less than the preset value). When the judging unit judges that the optimization of the weak classifying templates with the optimization parameter does not meet a certain condition, the optimization parameter is updated by the optimization parameter updating unit 133, namely that a new optimization parameter is obtained. A combination coefficient can be obtained by the 0.618 method, etc., and the new optimization parameter is obtained from the combination coefficient. The 0.618 method is just taken as an example, and other methods can be adopted. The 0.618 method as a linear search method matched with the method of steepest descent can be replaced by the Fibonacci method and the interpolation method. In fact, because the objective loss function has good analysis performance and is a convex function, many optimization methods can be used for optimizing the objective function. When the judging unit 132 judges that the optimization of the weak classifying templates with the optimization parameter meets the condition, the template updating unit 134 updates the weak classifying templates. Simultaneously, the learning unit 13 also includes an incremental learning sample updating unit 135, which is used for reducing incremental learning samples in the set including the incremental learning samples when the judging unit judges that the optimization of the weak classifying templates with the optimization parameter meets a certain condition, so that a new set including the incremental learning samples is obtained to update the templates of the following weak classifiers. More specifically, that is to say the updated samples of the weak classifiers in the incremental learning samples are removed. In the context of the present application, updating of the weak classifying templates is also called updating of the weak classifiers at times.

When the weak classifying templates of the weak classifiers are updated, the task of the learning unit is finished.

Figure 8:
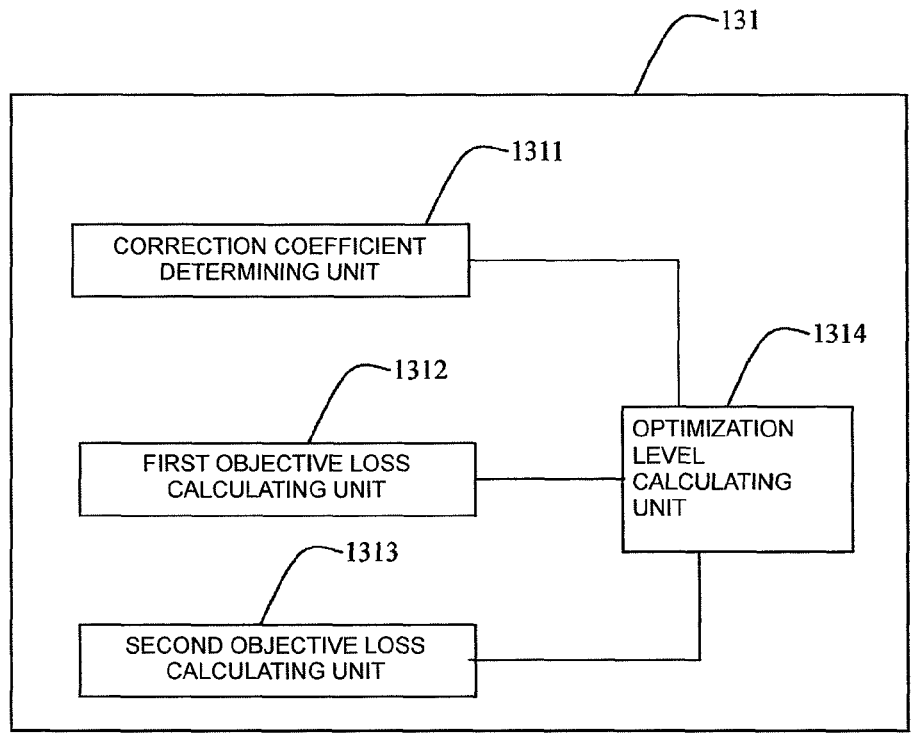
FIG. 8 shows a block diagram of the optimization level calculating part 131 in accordance with one embodiment of the invention.

FIG. 8 shows a block diagram of the optimization level calculating part 131 in accordance with one embodiment of the invention. As shown in FIG. 8, the optimization level calculating part 131 of the invention includes a correction coefficient determining unit 1311 for determining the correction coefficients of the incremental learning samples; a first objective loss calculating unit 1312 for calculating a first objective loss caused by using the optimization parameter to optimize the subinterval weak classifying templates; a second objective loss calculating unit 1313 for calculating second objective loss caused by using the optimization parameter to optimize the subinterval weak classifying templates in accordance with the input incremental learning samples; and an optimization level calculating unit 1314 for calculating the optimization level of the optimization of the weak classifying templates with the optimization parameter in accordance with the first objective loss calculated by the first objective loss calculating unit 1312, the second objective loss calculated by the second objective loss calculating unit 1313, and the correction coefficients of the incremental learning samples determined by the correction coefficient determining unit 1311.

Wherein, the first objective loss represents the influence of optimization on the capability for processing general environment and corresponds to the offline part of the following loss function; the second objective loss represents the influence of optimization on the capability for processing specific scenes and corresponds to the online part of the following loss function. The following text will describe the calculation of the two parts in detail. The first objective loss calculating unit can adopts the Naïve Bayes method to calculate the first objective loss. The following text will describe the calculation of the first objective loss calculating unit 1312 to the first objective loss and the second objective loss calculating unit 1313 to the second objective loss in detail.

Figure 9:
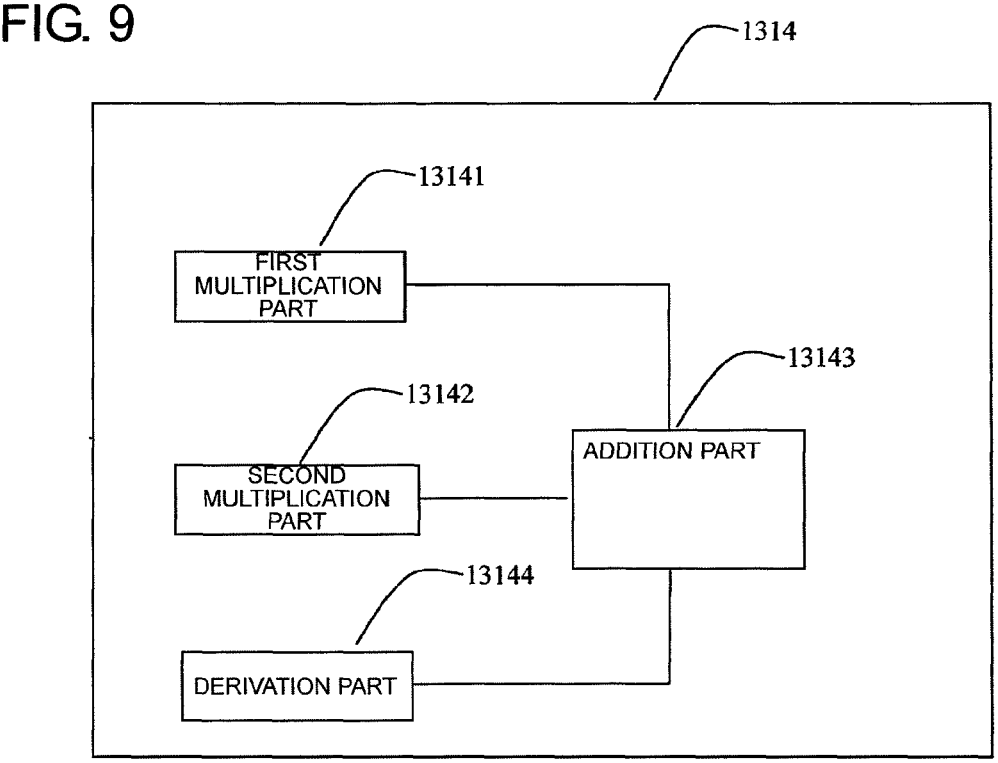
FIG. 9 shows a block diagram of the optimization level calculating part 1314 in accordance with one embodiment of the invention.

FIG. 9 shows a block diagram of the optimization level calculating unit 1314 in accordance with one embodiment of the invention. As shown in FIG. 9, the optimization level calculating unit 1314 of the invention includes a first multiplication part 13141, a second multiplication part 13142, an addition part 13143 and a derivation part 13144, wherein the first multiplication part 13141 is used for multiplying the difference between 1 and the correction coefficient determined by the correction coefficient determining unit 1311 by the first objective loss, the second multiplication part 13142 is used for multiplying the correction coefficient by the second objective loss, the addition part 13143 is used for adding the multiplication result of the first multiplication part to the multiplication result of the second multiplication part, and the derivation part 13144 is used for calculating the derivative of the added result of the addition part. The following text will give detailed description to the correction coefficient in accordance with Formulas 2 and 30.

Figure 10:
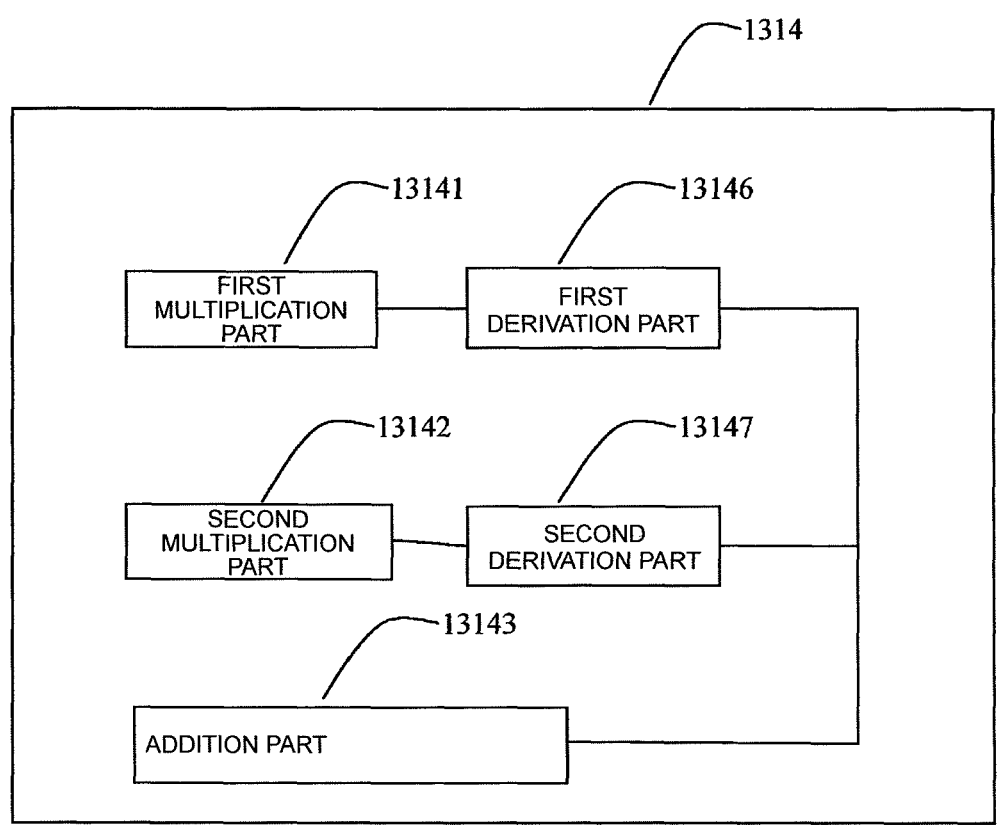
FIG. 10 shows a block diagram of the optimization level calculating part 1314 in accordance with another embodiment of the invention.

FIG. 10 shows a block diagram of the optimization level calculating unit 1314 in accordance with another embodiment of the invention. As shown in FIG. 10, the optimization level calculating unit 1313 of the invention includes the first multiplication part 13141, the second multiplication part 13142, a first derivation part 13146, a second derivation part 13147 and the addition part 13143, wherein the first multiplication part 13141 is used for multiplying the difference between 1 and the correction coefficient by the first objective loss, the second multiplication part 13142 is used for multiplying the correction coefficient by the second objective loss, the first derivation part 13146 is used for calculating the derivative of the multiplication result of the first multiplication part 13141, the second derivation part 13147 is used for calculating the derivative of the multiplication result of the second multiplication part 13142, and the addition part 13143 is used for adding the derivation result of the first derivation part to the derivation result of the second derivation part.

Now, take continuous domain-partitioning AdaBoost as an example to give detailed description to the embodiment of the invention.

Firstly, an incremental learning algorithm of the continuous domain-partitioning AdaBoost of the invention is introduced.

In fact, the AdaBoost algorithm uses an additive model to gradually optimize the objective function (called loss function in the following text) based on index loss so as to finally achieve logistic regression. The key objective function (loss function) is shown as Formula 5(1)

$$L(F(x)) = \sum_{i=1}^{n} w_i^0 \exp(-y_i F(x_i)) = E_{p(x,y)}(e^{-yF(x)}), \quad (1)$$

$$x \in \chi, y \in \{-1, +1\}$$

In the form of the loss function based on mathematical expectation, the instance X and the class label are taken as two stochastic variables (y=+1 corresponds to the positive instance, and y=−1 corresponds to the negative instance), and mathematical expectation is based on the joint probability density function p(x, y) including the two stochastic variables. In Formula 1, $(x_i, y_i)$ represents the $i^{th}$ sample, wherein $x_i$ represents the instance, $y_i$ represents the class label, L(F(x)) represents the objective loss function corresponding to the strong classifiers F(x), $w^0_i$ represents the initial weight of the $i^{th}$ sample, and p(x, y) represents the joint probability density function using the instance and the class label as two stochastic variables.

Figure 11:
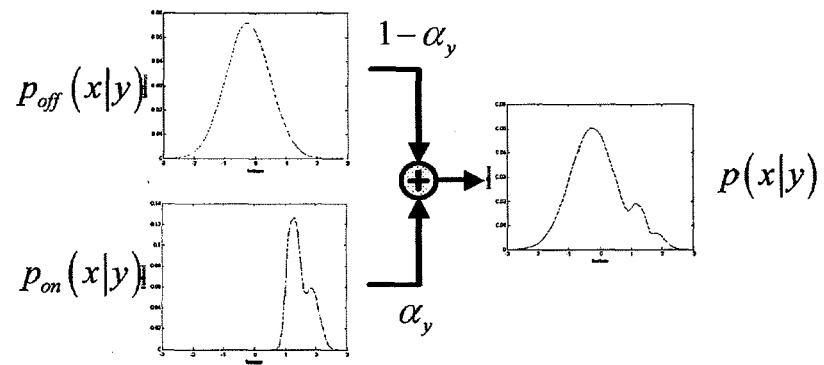
FIG. 11 shows a likelihood function for correcting each class in accordance with online samples.

The introduction of online samples (corresponding to the incremental learning samples in the invention) can change the joint probability density function to some extent. On the premise that samples of the positive instance and the negative instance do not interfere mutually, the change can be shown by respectively and linearly correct the likelihood of two classes. As shown in Formula 2:

$$p(x|y)=(1-\alpha_y)p_{off}(x|y)+\alpha_y p_{on}(x|y) \quad (2)$$

wherein, $p_{off}(x|y)$ and $p_{on}(x|y)$ respectively represent likelihood functions of classes y corresponding to offline samples and online samples, and $\alpha_y$ represents the linear correction coefficient against the classes y. The correction process can be shown in FIG. 11. FIG. 11 shows the likelihood function which corrects all classes in accordance with the online samples.

On the basis of the corrected likelihood function, the loss function (Formula 1) of the AdaBoost algorithm is changed into:

$$L(p(x, y), F(x)) = \sum_{y}(1 - \alpha_y)P(y) \cdot L(p_{off}(x \mid y), F(x)) + \quad (3)$$
$$\sum_{y} \alpha_y P(y) \cdot L(p_{on}(x \mid y), F(x))$$

wherein $$L(p_{off}(x \mid y), F(x)) = \int e^{-yF(x)} p_{off}(x \mid y) dx = E_{P_{off}(x|y)}(e^{-yF(x)}) \quad (4)$$

$$L(p_{on}(x \mid y), F(x)) = \int e^{-yF(x)} p_{on}(x \mid y) dx = E_{P_{on}(x|y)}(e^{-yF(x)}) \quad (5)$$

respectively represents the loss functions of classes y on the offline samples and the online samples so that the loss functions of four parts (the offline samples/the online samples, the positive instance/the negative instance) are linearly combined through the prior probability P(y) and the correction coefficient $\alpha_y$ of the two classes, and then the hybrid objective loss function of the AdaBoost algorithm after the online samples are introduced is obtained. Therefore, under the framework of the AdaBoost algorithm, the topic for discussion of the incremental learning algorithm is how to properly adjust the existing strong classifiers F(x) so as to obtain smaller loss value as far as possible under the condition of updated probability distribution (Formula 2). In other words, the incremental learning process based on the AdaBoost algorithm is to optimize the loss function shown in Formula 3.

In the process of optimizing the incremental learning algorithm, there are three main problems:

Firstly, the strong classifiers F(x) as a learning machine contain a large quantity of adjustable parameters. The problems of the optimization algorithm are that which parameter is suitable to be adjusted in the incremental learning process and which parameter is determined and can not be changed at offline learning, and selecting wrong optimization objects may greatly increase the complicated degree of the optimization algorithm.

Secondly, because online training samples are provided, the incremental learning algorithm can easily change the mathematical expectation in Formula 5 into weight summation so as to calculate the online part of the hybrid objective loss function (Formula 3). However, incremental learning which is similar to online learning does not store used training data, and thus, the offline training samples can not be used in the incremental learning process. Therefore, how to effectively calculate the offline part (namely Formula 4) of the hybrid objective loss function becomes the key problem of the incremental learning algorithm, which is also the main crux of the whole algorithm.

Finally, the hybrid objective loss function is obtained by combining the offline part and the online part through the linear correction coefficient $\alpha_{y'}$. In fact, the value of the coefficient $\alpha_{y'}$ determines the concern degree of the incremental learning algorithm on the offline samples and the online samples in the optimization process. We can weigh the concern degree of the strong classifiers after incremental learning to general environment (described by the offline samples) and special conditions (described by the online samples) by adjusting the coefficient $\alpha_{y'}$. Therefore, how to select a suitable correction coefficient is an unavoidable problem of the incremental learning algorithm.

Now, we commence on the problem of directivity so as to determine the adjustable parameters of the strong classifiers in the incremental learning process by analyzing the classification prediction flow of the continuous domain-partitioning AdaBoost algorithm; subsequently, adopt a method the same as the Naïve Bayes method to reasonably approximate the offline part of the hybrid objective loss function; then, briefly introduce the online part calculating method of the hybrid objective loss function and how to optimize the hybrid objective loss function in the incremental learning process; finally, put forward an adaptive adjustment method of the linear correction coefficient $\alpha_{y'}$.

Be different from other traditional Boosting algorithms focusing on how to select suitable combination coefficients of the weak classifiers, the continuous domain-partitioning AdaBoost algorithm proposed by R. E. Schapire and Y. Singer has no explicit combination coefficient selecting process of the weak classifiers, but merges it into the training process of the weak classifiers, because the weak classifiers are allowed to output any real number to represent the degree of confidence for the classification prediction result. To be brief, the domain-partitioning weak classifiers are designed by the method that an instance space x of samples is divided into a series of subintervals $\{x_1, \ldots, x_n\}$ which are not crossed mutually by the weak classifiers f(x) with the help of the domain-partitioning function r(x), and the same weak classification prediction result $c_z$ is output to all instances in the $z^{th}$ subinterval, namely $$x \in \chi_z|_{r(\cdot)} \Rightarrow r(x) = z \in \mathbb{N} \Rightarrow f(x) = c_z \in \mathbb{R} \tag{6}$$

In the weak classification prediction process, z can be regarded as the observation of the instance X under the domain-partitioning function r(x). If the look-up-table function s(z) is used for representing the mapping relation from the observation value z to the prediction result $c_z$, the weak classifiers f(x) can be shown as $$f(x) = s(r(x)) \tag{7}$$

Figure 12:
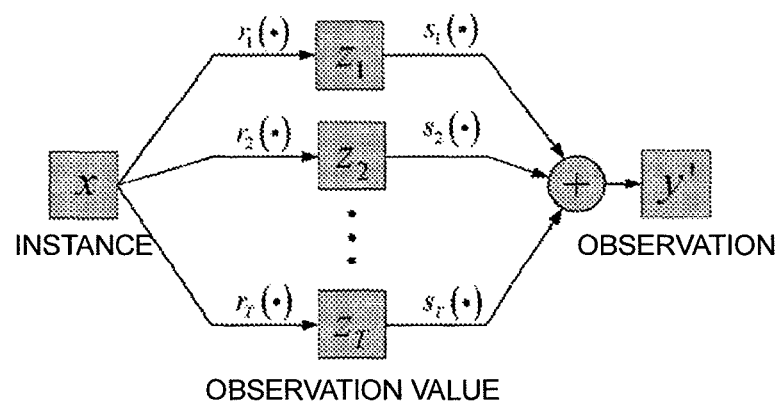
FIG. 12 shows a prediction flow of strong classifiers including domain-partitioning weak classifiers.

However, the classification prediction of the strong classifiers $$F(x) = \sum_{i=1}^{T} f_i(x)$$

to the instance x can be represented in the flow shown as FIG. 12.

Figure 13:
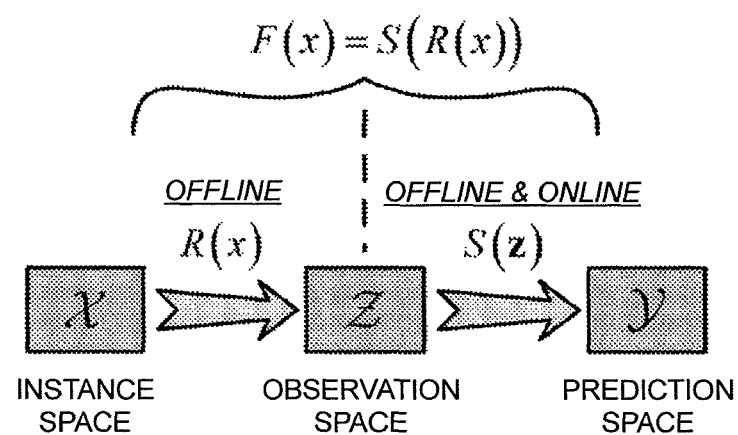
FIG. 13 shows three spaces and two stages referring to the prediction process of the strong classifiers.

Wherein, the observation $z_1, \ldots, z_T$ respectively belongs to different weak classifiers. They are combined to form the observation vector $z = (z_1, \ldots, z_T) \in \mathcal{Z} \subset \mathbb{N}^T$ of the strong classifiers in the prediction process to the instance x, wherein Z represents the T-Dimensional observation space of the vector. The observation values belonging to different weak classifiers are aggregated through the weak prediction result obtained by calculating respect corresponding lookup tables to obtain the final prediction result $y' \in Y \subseteq \mathbb{R}$ of the strong classifiers F(x) to the instance x, wherein y represents the prediction space of the strong classifiers. The symbol of the final prediction result represents the judgment of the strong classifiers to the class of the instance, and the absolute value thereof represents the degree of confidence of the strong classifiers for the judging result of the class. A certain effective mapping relation is established by the strong classifiers F(x) between the input instance x and the output prediction result y' in such as way, and an observation space Z is introduced to disaggregate the prediction flow F(x): X→Y of the strong classifiers into two different stages: R(x):X→Z and S(z):Z→Y, wherein the former is the joint domain partitioning function, $$R(x) = (r_1(x), \ldots, r_T(x)) = z \tag{8}$$

which completes the transformation from the instance space x to the observation space Z, and the later is the aggregated look-up-table function, $$S(z) = \sum_{i=1}^{T} s_i(z_i) = \sum_{i=1}^{T} c_{i,z_i} = y' \tag{9}$$

which calculates the prediction result of the strong classifiers in accordance with the observation vector z, wherein $$c_{i,z_i} = s_i(z_i) \tag{10}$$

is the constant prediction result of the look-up-table function to the $z_i^{th}$ subinterval in the $i^{th}$ weak classifier (refer to Formula 6). The relation among the joint domain-partitioning function R(x), the aggregated look-up-table function S(z) and the strong classifiers F(x) and the relation among the instance space x, the observation space z and the prediction space y can be clearly shown in FIG. 13.

The joint domain-partitioning function R(x) determines the division mode of the instance space x by each weak classifier in the strong classifiers. In the offline learning process, in order to determine a suitable division mode, the training algorithm needs the help of some distinguishing criterions such as KL divergence, Bhattacharyya distance, etc. to carry out precise unparameterized analysis to the distribution condition of all classes in the instance space x, which needs a large quantity of training samples. However, the incremental learning process does not have such condition. There are such a few online training samples that the incremental learning algorithm can not effectively predict the influence of the change of R(x) on the offline part (Formula 4) of the hybrid objective loss function, which means that for the strong classifiers F(x), only some fine adjustments to parameters of R(x) may cause unexpected serious result when general environment represented by the offline training samples are processed. Therefore, we provide the incremental learning algorithm which only focuses on how to properly adjust the aggregated look-up-table function S(z) in accordance with a small quantity of online training samples, and the joint domain-partitioning function R(x) can be determined once in the offline learning process with sufficient samples and can not be changed in the incremental learning process.

In the detecting algorithm for specific subjects (such as face) in the present application, after the weak classifiers map an input high dimensional instance to a single dimensional feature space through the sparse granularity features, the input high dimensional instance is divided at intervals in accordance with the piecewise linear function so as to calculate the final classification prediction result, which is a specific implementation form of domain partition of the weak classifiers proposed by R. E. Schapire and Y. Singer. In the offline training process, the joint domain-partitioning function R(x) of the strong classifiers is determined by the sparse granularity features of all weak classifiers, the upper and lower boundaries of the piecewise linear function and the number of the subintervals, and the aggregated look-up-table function S(z) is obtained by calculating the distribution condition of the weight of positive instances and negative instances in all of the subintervals.

Because the output results of lookup tables of all of the weak classifiers are used as parameters (refer to Formula 9), it can be shown as S(z:c), wherein $c=(c_{11}, c_{12}, \ldots, c_{21}, \ldots, c_{T1}, \ldots)$ represents the parameter vector including all of the output results of the lookup tables. Under the condition, the incremental learning algorithm actually aims to search a suitable parameter adjustment value $\Delta c$ on the basis of the aggregated look-up-table function S(z:c) determined by offline training to optimize the strong classifiers $F(x)=S(R(x):c+\Delta c)$ with updated parameters, and simultaneously, the hybrid objective loss function (Formula 3) of the AdaBoost algorithm of the offline samples and the online samples is considered.

Approximate Calculation of an Offline Part in a Hybrid Objective Loss Function

The following is an introduction to the approximate calculation of an offline part in a hybrid objective loss function, corresponding to the calculation of a first objective loss calculating unit 1312.

Because the joint domain-partitioning function R(x) uniquely determines the mapping relation from the instance space x to the observation space z (refer to FIG. 13), on the premise of giving R(x), incremental learning can transform the calculation of the offline part (Formula 4) in the hybrid objective loss function from the instance space x to the observation space z, namely $$L(p_{off}(x|y), F(x)) = \sum_z e^{-yS(x)} p_{off}(z|y) = E_{P_{off}(z|y)}(e^{-yS(z)}) \quad (11)$$

wherein $$P_{off}(z|y) = \int_{x:R(x)=z} P_{off}(x|y)dx \quad (12)$$

is a likelihood function of class y in the observation space z.

According to a definition 9, in fact, an aggregated look-up-table function obtained by updating a parameter is the sum of the two parts, $$S(z:c+\Delta c)=S(z:c)+S(z:\Delta c) \quad (13)$$

and thus, the offline part (Formula 11) in the hybrid objective loss function can be represented as $$L(p_{off}(x|y):c+\Delta c) = \sum_z e^{-yS(z:c+\Delta c)} P_{off}(z|y) \quad (14)$$

$$= \sum_z e^{-yS(z:\Delta c)} e^{-yS(z:x)} P_{off}(z|y)$$

$$= L(p_{off}(x|y):c) \sum_z e^{-yS(z:\Delta c)} \hat{P}_{off}(z|y)$$

wherein $L(p_{off}(x|y):c)$ and $L(p_{off}(x|y):c+\Delta c)$ are the abbreviate form of the offline part in the hybrid objective loss function corresponding to the strong classifier which is updated or not respectively (the complete form is $L(p_{off}(x|y), S(R(x):c))$ and $L(p_{off}(x|y), S(R(x):c+\Delta c))$, but $$\hat{P}_{off}(z|y) = \frac{e^{-yS(z:c)} P_{off}(z|y)}{L(p_{off}(x|y):c)} \quad (15)$$

is a likelihood function of class y in the observation space z according to the weighted index loss of the aggregated look-up-table function S(z:c) which is not updated. Because $\Sigma_z \hat{P}_{off}(z|Y)=1$, it is still a probability distribution.

Apparently, in the calculation process of the offline part of the hybrid objective loss function, how to get the weighted likelihood function $\hat{P}_{off}(z|y)$ becomes a key problem. However, because offline training samples are not stored in the incremental learning process, the algorithm is impossible to simulate the weighted likelihood function by the mode of sampling summation. Meanwhile, recording the distribution condition of the likelihood function in the offline training process may be unfavorable, because with the increase of the number of weak classifiers, the necessary storage space for recording will be increasing in exponential order. Thus, in the incremental learning, we advance to approximate the weighted likelihood function by using the product of marginal distribution on each observed quantity $$\hat{P}_{off}(z \mid y) \approx \prod_{i=1}^{T} \hat{P}_{off}(z_i \mid y) \quad (16)$$

wherein $$\hat{P}_{off}(z_i \mid y) = \sum_{\Delta z_i} \hat{P}_{off}(z \mid y) \quad (17)$$

is a marginal probability density function of the weighted likelihood function $\hat{P}_{off}(z|y)$ on the observed quantity $z_i$.

In fact, the approximating mode is a Naïve Bayes method. It just needs the incremental learning to record the marginal distribution condition of a joint probability density function on each observed quantity. Thus, with the increase of the number of the weak classifiers (namely the number of the observed quantities), the increasing speed of the storage space for recording the weighted likelihood function is decreased from the original exponential level to the linear level. In the calculating process of applying the approximate method in the offline part (Formula 14) of the hybrid objective loss function shown in Formula 16, and according to the linear property (refer to Formula 9) of the aggregated look-up-table function $S(z:c)$, we have $$L(p_{off}(x \mid y): c + \Delta c) \approx \tilde{L}(p_{off}(x \mid y): c + \Delta c) = \quad (18)$$

$$L(p_{off}(x \mid y): c) \sum_z e^{-yS(z:\Delta c)} \prod_{i=1}^{T} \hat{P}_{off}(z_i \mid y) =$$

$$L(p_{off}(x \mid y): c) \sum_{z_1} \cdots \sum_{z_T} \prod_{i=1}^{T} \hat{P}_{off}(z_i \mid y) \exp(-y \cdot \Delta c_{i,z_1}) =$$

$$L(p_{off}(x \mid y): c) \prod_{i=1}^{T} \sum_{z_i} \hat{P}_{off}(z_i \mid y) \exp(-y \cdot \Delta c_{i,z_1}) =$$

$$L(p_{off}(x \mid y): c) \prod_{i=1}^{T} M_i$$

wherein $\tilde{L}(p_{off}(x|y):c+\Delta c)$ represents the approximant of the offline part of the hybrid objective loss function, and $$M_i = \sum_{z_i} \hat{P}_{off}(z_i \mid y) \exp(-y \cdot \Delta c_{i,z_1}) \quad (19)$$

represents the weighted marginal likelihood function $\hat{P}_{off}(z_i|y)$ on the observed quantity $z_i$ because of the index loss caused by introducing a parameter adjustment value $\Delta c$. Thus, by exchanging the order of multiplication and addition, the calculating time complexity of the offline part of the hybrid objective loss function is decreased from the exponential level to the linear level like the introduced storage space complexity.

It should be pointed out that when $\Delta c = 0$, namely the parameter of the aggregated look-up-table function is not adjusted, $M_i = 1$, $i = 1, \ldots, T$. Thus $$L(p_{off}(x|y):c+\Delta c)|_{\Delta c=0} = \tilde{L}(p_{off}(x|y):c+\Delta c)|_{\Delta c=0} \quad (20)$$

In addition, the partial derivative of any parameter $\Delta c_{pq}$ in $\Delta c$ (namely the prediction result output by the $p^{th}$ look-up-table function to the $q^{th}$ subinterval) is calculated, and according to Formula 6-14, we have $$\frac{\partial L(p_{off}(x \mid y): c + \Delta c)}{\partial \Delta c_{pq}} = L\binom{p_{off}}{(x \mid y):c} \frac{\partial \left(\sum_z P_{off}(z \mid y) \exp\left(-y \sum_{i=1}^{T} \Delta c_{i,z_1}\right)\right)}{\partial \Delta c_{pq}} \quad (21)$$

$$= y \cdot L(p_{off}(x \mid y):c)$$

$$\sum_{z:z_p=q} \hat{P}_{off}(z \mid y) \exp\left(-y \sum_{i=1}^{T} \Delta c_{i,z_1}\right)$$

while according to Formula 18, we have $$\frac{\partial \tilde{L}(p_{off}(x \mid y): c + \Delta c)}{\partial \Delta c_{pq}} = L(P_{off}(x:y):c) \frac{\partial \prod_{i=1}^{T} M_i}{\partial \Delta c_{pq}} \quad (22)$$

$$= -y \cdot L(P_{off}(x \mid y):c) \hat{P}_{off}(z_p \mid y)$$

$$\prod_{i=1: \neq p}^{T} M_i$$

$$\frac{\partial L(P_{off}(x \mid y)c + \Delta c)}{\partial \Delta c_{pq}}\bigg|_{\Delta c=0} = y \cdot L(P_{off}(x \mid y):c) \sum_{z:z_p=q} \hat{P}_{off}(z \mid y) \quad (23)$$

$$= -y \cdot L(P_{off}(x \mid y): c) \hat{P}_{off}(z_p = q \mid y)$$

$$= \frac{\partial \tilde{L}(P_{off}(x \mid y):c + \Delta c)}{\partial \Delta c_{pq}}\bigg|_{\Delta c=0}$$

Thus, when $\Delta c = 0$, the two hybrid objective loss functions not only have the same function value (Formula 20), but also have the same gradient (Formula 23). Thus, from the point of view of Taylor expansion, under the condition that $\|\Delta c\|_2$ is not too large, $\tilde{L}(p_{off}(x|y):c+\Delta c)$ calculated by using the marginal distribution function is the reasonable approximation of $L(p_{off}(x|y):c+\Delta c)$ calculated by using the joint distribution function.

Thus, it is proved that the method of using the product of the marginal distributions function to approximate the joint distribution function not only decreases the space complexity and the time complexity of the calculating process of the offline part of the hybrid objective loss function from the exponential level to the linear level so as to enable the algorithm to be used for solving physical problems, but also ensures that the result of approximate calculation has enough precision under the condition that the parameter adjustment value $\Delta c$ has little change.

As the key part of the approximate algorithm, the offline weighted marginal distribution function $\hat{P}_{off}(z_i|y)$ as shown in Formula 17 is obtained by carrying out statistics to the distribution of offline samples on each observed quantity before incremental learning, namely in the offline learning process. The calculating process is as follows $$\hat{P}_{off}(z_i \mid y) = \frac{\sum_{k=1}^{N_{off}^y} [\![r_i(x_k) = z_i]\!] \exp(-y \cdot S(R(x_k):c))}{N_{off}^y \cdot L(p_{off}(x \mid y), c)} \quad (24)$$

wherein $N_{off}^y$ is the offline sample number of class y, and $$[\![r_i(x_k) = z_i]\!] = \begin{cases} 1, & \text{if } r_i(x_k) = z_i \\ 0, & \text{other situations} \end{cases}$$

Refined Calculation of an Online Part in the Hybrid Objective Loss Function

This article has introduced how to use a Naïve Bayes method to carry out approximate calculation to the offline part in the hybrid objective loss function. As for the calculation of the online part (Formula 5), namely the calculation corresponding to a second objective loss calculating unit 1313, the corresponding joint distribution function can be simulated by an online training sample, and thus, we have $$L(p_{on}(x \mid y), c + \Delta c) = \frac{1}{N_{on}^y} \sum_{k=1}^{N_{on}^y} \exp(-y \cdot S(R(x_k):c + \Delta c)) \quad (25)$$

$$= \frac{1}{N_{on}^y} \sum_{k=1}^{N_{on}^y} \exp(-y \cdot S(R(x_k):c)) \cdot \exp(-y \cdot S(R(x_k):c))$$

$$= \sum_{k=1}^{N_{on}^y} w_y(k) \prod_{i=1}^{T} \exp(-y \cdot \Delta c_{i,r_i(x_k)})$$

wherein $N_{on}^y$ is the number of the online training samples of class y, $\Delta c_{i,ri(xk)}$ is the adjusting quantity output in prediction of the subinterval corresponding to the $k^{th}$ sample in the $i^{th}$ weak classifier look-up-table function, and $$w_y(k) = \frac{1}{N_{on}^y} \exp(-y \cdot S(R(x_k):c)) \quad (26)$$

is the initial weight corresponding to the $k^{th}$ online sample in class y in the incremental learning process. In fact, it is obtained by adjusting strong classifier output $S(R(x_k):c)$ obtained according to offline learning. The meaning of the weight is the same as that of the previous Boosting algorithm, presenting the wrong classification degree of the current strong classifier to the sample.

The partial derivative of the online part of the hybrid objective loss function to any of the adjusting quantity parameter $\Delta c_{pq}$ is $$\frac{\partial L(p_{on}(x \mid y), c + \Delta c)}{\partial \Delta c_{pq}} = -y \sum_{k=1}^{N_{on}^y} w_y(k) \prod_{i=1}^{T} \frac{[\![r_p(x_k) = q]\!]}{\exp(-y \cdot \Delta c_{i,r_i(x_k)})} \quad (27)$$

The Optimization Method of a Hybrid Objective Loss Function

Now, we advance the approximate and refined calculation method respectively for the offline part and the online part of the hybrid objective loss function (Formula 3) in the incremental learning process. For solving the actual optimization problem in the incremental learning process, we advance a method of using the approximate mode shown as follows to calculate the hybrid objective loss function value corresponding to different adjusting quantity parameter $\Delta c$, $$\tilde{L}(p(x, y), c + \Delta c) = \sum_y (1 - \alpha_y) P(y) \cdot \tilde{L}(p_{off}(x \mid y), c + \Delta c) + \quad (28)$$

$$\sum_y \alpha_y P(y) \cdot L(p_{on}(x \mid y), c + \Delta c) \approx (p(x, y), c + \Delta c)$$

the only difference between it and the accurate result $L(p(x,y),c+\Delta c)$ is that the offline part is obtained by approximate calculation by the Naïve Bayes method. Because it has been proved above that the approximate calculation has enough accuracy, from the point of view of Taylor expansion, under the condition that $\|\Delta c\|_2$ is not too large, Formula 28 is the reasonable approximation to the hybrid objective loss function in the incremental learning process.

Formula 28 is the hybrid objective loss function in the incremental learning process. Wherein Formula 25 is the online part, and Formula 18 is the offline part. It should be noted that in Formula 18, we use the Naïve Bayes method to carry out reasonable approximation to the objective loss function of the offline part. Thus, in Formula 28, $L(p(x,y),c+\Delta c)$ is an accurate objective loss function, and $\tilde{L}(p(x,y),c+\Delta c)$ is an approximate objective loss function by using the offline approximate method. As mentioned previously, we can also carry out refined calculation to the objective loss function of the offline part, but it will increase the calculating burden.

It is easy to prove that for the parameter $\Delta c$, the approximate hybrid objective loss function shown in Formula 27 is a convex function. Thus, we can use a steepest descent method to calculate the gradient of the approximate hybrid objective loss function according to the partial derivatives in Formula 22 and Formula 26, and combine the 0.618 method to carry out the linear search in the gradient direction. Finally, after several times of iteration, the optimization result is obtained (see Formula 29), that is to say, $\Delta c$ represents some adjusting quantity in a look-up-table, and $\Delta c^*$ is the one which can optimize the objective loss function of all the adjusting quantities.

$$\Delta c^* = \arg\min_{\Delta c} (\tilde{L}(p(x, y), c + \Delta c)) \quad (29)$$

Here, argmin represents the value which can minimize the function $\tilde{L}(p(x,y),c+\Delta c)$ within the value range of all independent variables (here is $\Delta c$), that is to say $\tilde{L}(p(x,y),c+\Delta c^*)$ is the minimum value in all possible objective loss function values.

The incremental learning result is the updated strong classifier $F(x)=S(R(x),c+\Delta c^*)$. It deserves to be specially noted that the adjustment of the previous Boosting algorithm to each weak classifier is a sequential process, and the strong classifier obtained by adjustment is a stage-wise optimization result. However, aiming at the adjustment to all the weak classifiers, the incremental learning advanced in this article can form a parallel process, and the strong classifier obtained after adjustment is a global optimization result.

An Adaptive Selection Method of a Correction Coefficient $\alpha_y$

According to Formula 2, it is easy to find the contributions of an offline sample and an online sample to a correction likelihood function are $(1-\alpha_y)/N^y_{off}$ and $\alpha_y/N^y_{on}$ respectively, wherein $N^y_{off}$ and $N^y_{on}$ respectively represent the number of the offline samples and the number of the online samples of class y. Thereby, we can define $$\lambda_y \frac{\alpha_y}{N^y_{on}} \bigg/ \frac{(1-\alpha_y)}{N^y_{off}} \qquad (30)$$

is the reinforce ratio of online samples of class y, representing that the contribution of each online sample to the likelihood function is equivalent to that of several offline samples.

In the practical application, the online samples are usually obtained by gradual accumulation by the manual calibration of a user, and thus, in the incremental learning process, the number of the online samples is greatly changed frequently. In this case, if directly designating the value of the correction coefficient $\alpha_y$ without considering the number of the samples, according to Formula 30, the average contribution of each online sample to the likelihood function, namely the reinforce ratio $\lambda_y$ of the online samples, can fluctuate acutely. The reasonable mode is to keep the stable reinforce ratio $\lambda_y$ of the online samples in the incremental learning process. Thus, the correction coefficient $\alpha_y$ is correspondingly adjusted according to the change of the number of the online samples $N^y_{on}$. The larger the number of the online samples is, the higher the attention degree of the optimization process of the incremental learning to the online part of the hybrid objective loss function is, and vice versa. In fact, the key point of the adaptive parameter selection method is to ensure that the action of each online sample is not influenced by the change of the total quantity of the online samples. In other words, the algorithm should make the ratio of the weight coefficient $\alpha_y/N^y_{on}$ of the loss of each online sample in the objective loss function to the weight coefficient $(1-\alpha_y)/N^y_{off}$ of the loss of each offline sample in the objective loss function keep unchanged (refer to Formula 30). The task can be completed by a correction coefficient determining unit 1311.

The incremental learning device and the incremental learning method based on a continuous AdaBoost algorithm are introduced above. The invention can also be used for an incremental learning device and an incremental learning method based on a region segmentation Vector Boosting algorithm. In fact, there is no essential difference between the incremental learning devices and methods based on the continuous AdaBoost algorithm and the region segmentation Vector Boosting algorithm. The concepts of R(x) and S(z) are not changed, and only the output of S(z) is changed from a scalar to a vector.

The Vector Boosting algorithm is a multi-class classification algorithm based on the continuous AdaBoost algorithm. The two algorithms measure the severity of wrong classification to the training samples according to an index loss function, and use an additive model to optimize the objective loss function. The main difference between the two algorithms is that the problem solved by the continuous AdaBoost algorithm is a binary classification problem, the output of the classifier is a prediction result F(x) in scalarization, and the classification margin of the training sample (x, y) is yF(x); and the problem solved by the Vector Boosting algorithm is a multi-class classification problem, the output of the classifier is a prediction result F(x) in vectorization, and the classification margin of the training sample $(x,\tilde{v})$ is defined as $\tilde{v} \cdot \tilde{F}(x)$ which is the dot product of the essential projection vector $\tilde{v}$ and the prediction result F(x) in a homogeneous coordinates space. However, on the premise of using a region segmentation weak classifier, there is no essential difference between the incremental learning algorithm corresponding to the Vector Boosting algorithm and the continuous AdaBoost algorithmic. The reasons are as follows:

In the framework of the Vector Boosting algorithmic, the hybrid objective loss function of the incremental learning process is $$L(p(x,\tilde{v}), F(x)) = \sum_{\tilde{v}} (1-\alpha_{\tilde{v}}) P(\tilde{v}) \cdot L(p_{off}(x|\tilde{v}), F(x)) + \qquad (31)$$

$$\sum_{\tilde{v}} \alpha_{\tilde{v}} P(\tilde{v}) \cdot L(p_{on}(x|\tilde{v}), F(x))$$

wherein $$L(p_{off}(x|\tilde{v}), F(x)) = E_{p_{off}(x|\tilde{v})}\left(e^{-\tilde{v}\cdot \tilde{F}(x)}\right) \qquad (32)$$

$$L(p_{on}(x|\tilde{v}), F(x)) = E_{p_{on}(x|\tilde{v})}\left(e^{-\tilde{v}\cdot \tilde{F}(x)}\right) \qquad (33)$$

Compared with Formula 3, Formula 4 and Formula 5 corresponding to the continuous AdaBoost algorithm, the main difference is that a binary random scalar y originally used for representing a class attribute is changed into a multi-value random vector $\tilde{v}$, and the representing mode of the classification margin is accordingly changed from yF(x) into $\tilde{v} \cdot \tilde{F}(x)$. But these changes do not influence the analysis and the grasp of this article to the observation space z of the strong classifier. Thus, in the framework of the Vector Boosting algorithmic, the joint domain-partitioning function R(x) is determined in the offline training process, and in the incremental learning process, we just focus how to adjust the vectorization output of the aggregated look-up-table function S(z).

The same with the previous method, in the framework of the Vector Boosting algorithm, the incremental learning algorithm can still use the Naïve Bayes method to carry out approximate calculation to the offline part of the hybrid objective loss function (Formula 32). The result is shown as follows:

$$L(p_{off}(x|\tilde{v}):c+\Delta c) \approx \tilde{L}(p_{off}(x|\tilde{v}):c+\Delta c) = \qquad (34)$$

$$L(p_{off}(x|\tilde{v}):c)\prod_{i=1}^{T}\sum_{Z_i}\hat{P}_{off}(z_i|\tilde{v})\exp(-v\cdot \Delta c_{i,z_1})$$

wherein $\Delta c_{i,z_i}$ represents the variable quantity of the output result of the $z_i^{th}$ subinterval in the $i^{th}$ weak classifier. It should be noted that, at this time, elements in the look-up-table are vectors, but not scalars. Besides, Formula 34 and Formula 18 corresponding to the continuous AdaBoost algorithm are almost the same. However, the online part (Formula 33) of the hybrid objective loss function can be represented as the form which is extremely similar to Formula 25, $$L(p_{on}(x|\tilde{v}), c+\Delta c) = \sum_{k=1}^{N^y_{on}} w_{\tilde{v}}(k) \prod_{i=1}^{T} \exp(-v\cdot \Delta c_{i,r_i(x_k)}) \qquad (35)$$

Thus, the incremental learning process corresponding to the Vector Boosting algorithm can use the gradient descent method the same with the previous method to carry out iteration majorization to the hybrid objective loss function shown in Formula 31 so as to finally obtain the strong classifier $F(x)=S(R(x):c+\Delta c)$ which is obtained by adjusting the online samples.

The following is a introduction to the incremental learning algorithm of the detector of the invention.

Figure 14:
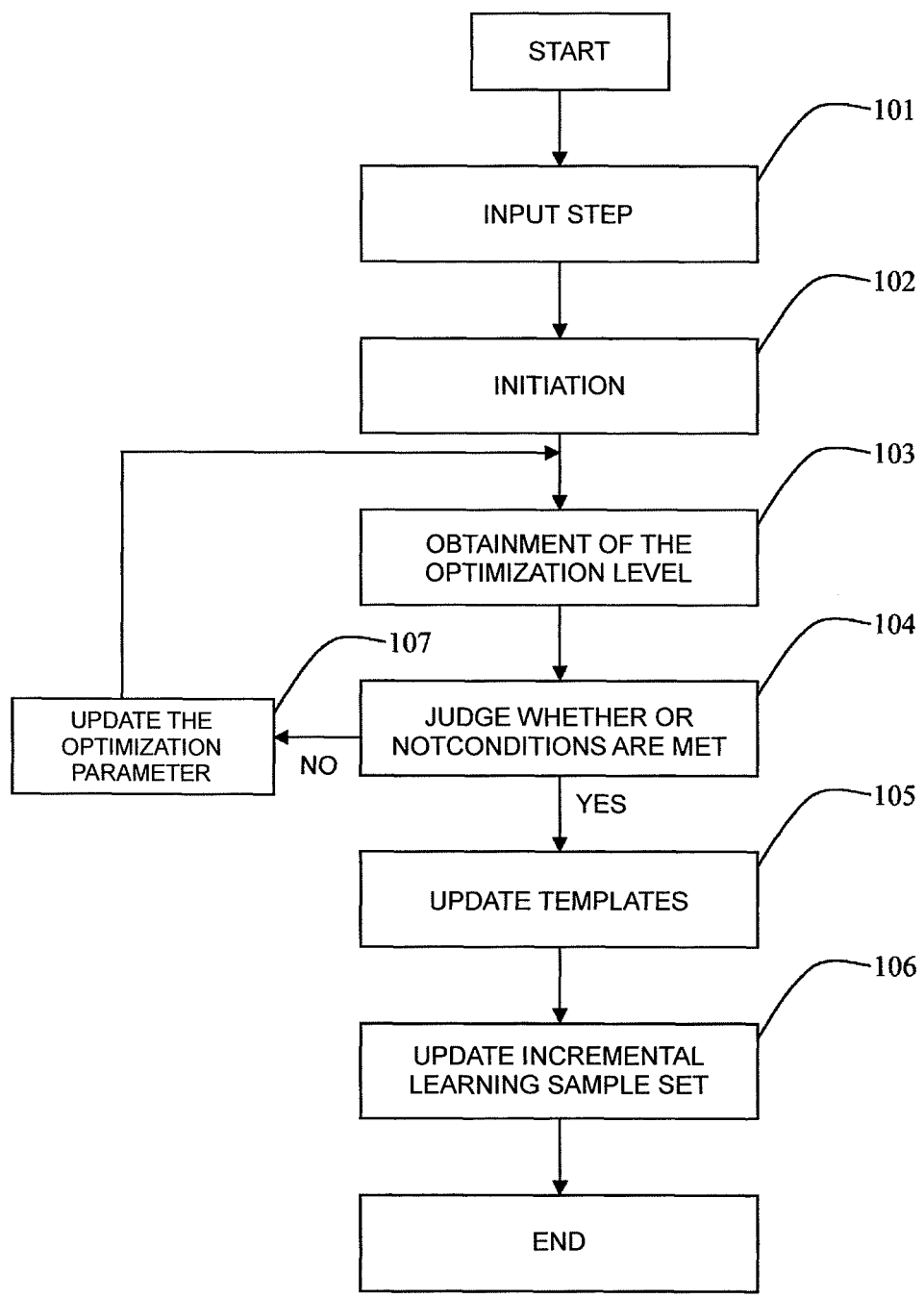
FIG. 14 shows a flow diagram of the incremental learning method in accordance with the embodiment of the invention.

FIG. 14 shows a flow chart of an incremental learning method in accordance with the embodiment of the invention. As shown in FIG. 14, the incremental learning method includes the following steps. Firstly, in Step 101, an appropriate reinforce ratio (may be between 10 and 100.), classifier templates of strong classifiers of each layer of the existing detector and the set of online samples are input. Here, the classifier templates of the strong classifiers of each layer, namely templates of weak classifiers included in each of the strong classifiers, specifically are subinterval classifying templates of each of the weak classifiers in the invention. In addition, the input here should be in a broad sense, and can be in various forms, such as reception from Internet, extraction from storage media, manual input. Then, in Step 102, initialization is carried out, specifically set an initial optimization parameter (template adjustment value). For example, it is set to zero. In Step 103, the level of optimization with the initial optimization parameter according to input incremental learning samples is obtained. In the embodiment, the optimization level is the gradient of hybrid objective functions.

Figure 15:
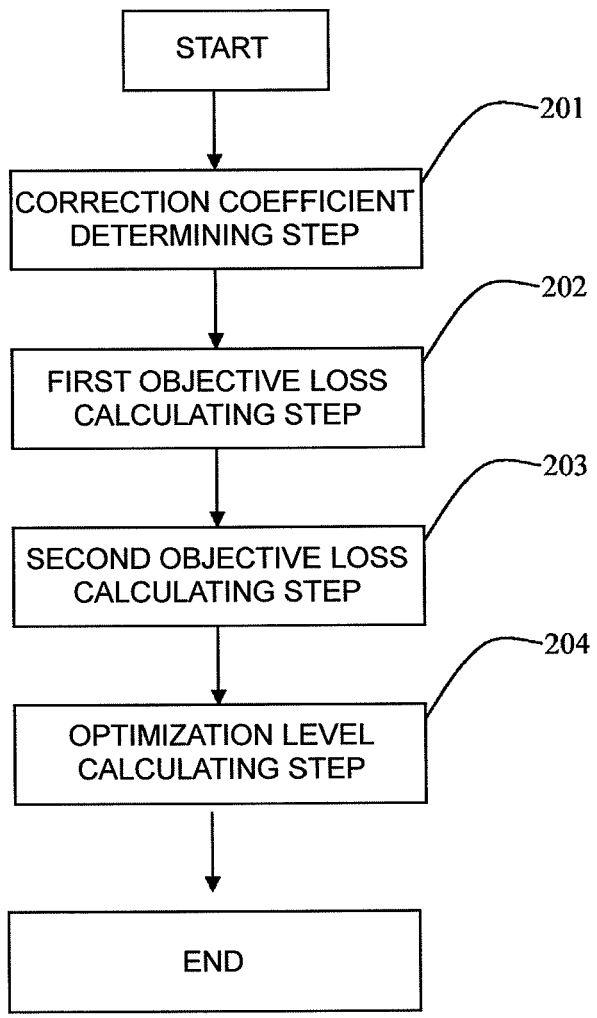
FIG. 15 shows a flow diagram of one embodiment for calculating the optimization level.

FIG. 15 shows a flow chart of an embodiment for calculating the optimization level. As shown in FIG. 15, the calculation of the optimization level includes a correction coefficient determining Step 201, a first objective loss calculating Step 202, a second objective loss calculating Step 203 and an optimization level calculating Step 204.

The correction coefficient determining Step 201 is used for determining the correction coefficient of incremental learning samples. For example, the correction coefficient can be calculated by using the reinforce ratio obtained through the initialization step according to Formula 30.

The first objective loss calculating Step 202 is used for calculating the first objective loss caused by optimizing subinterval weak classifying templates with the optimization parameter.

The second objective loss calculating Step 203 is used for calculating the second objective loss caused by optimizing the subinterval weak classifying templates with the optimization parameter according to the input incremental learning samples.

The optimization level calculating Step 204 is used for calculating the level of optimization of the weak classifying templates with the optimization parameter according to the first objective loss calculated in the first objective loss calculating Step 202, the second objective loss calculated in the second objective loss calculating Step 203 and the correction coefficient of the incremental learning samples determined by the correction coefficient determining Step 201. The Step 204 includes a first multiplication step, a second multiplication step, a first derivation step, a second derivation step and an addition step. The first multiplication step is used for multiplying the difference between 1 and the correction coefficient by the first objective loss. The second multiplication step is used for multiplying the correction coefficient by the second objective loss. The first derivation step is used for carrying out derivation for the multiplication result of the first multiplication step. The second derivation step is used for carrying out derivation for the multiplication result of the second multiplication step, and the addition step is used for adding the derivation result of the first derivation step to the derivation result of the second derivation step. The optimization level calculating Step 204 can also include a first multiplication step, a second multiplication step, an addition step and a derivation step. The first multiplication step is used for multiplying the difference between 1 and the correction coefficient by the first objective loss. The second multiplication step is used for multiplying the correction coefficient by the second objective loss. The addition step is used for adding the multiplication result of the first multiplication step to the multiplication result of the second multiplication step, and the derivation step is used for carrying out derivation for the addition result of the addition step.

Technicians in the field can completely understand the steps by referring to the formulas under the instruction of the application, and therefore, the steps are no longer further discussed. In addition, the technicians in the field can also design other calculation methods according to the formulas and under the instruction of the application, and these are all within the range of the invention.

Now, we return to FIG. 14, and in Step 104, whether or not the optimization parameter is an acceptable optimization parameter for the weak classifying templates is judged according to the calculating result obtained in Step 103 for obtaining the optimization level. The judgment can be carried out by judging whether or not the calculating result meets certain conditions, such as judging whether or not the optimization parameter is within the preset range, and for example, the optimization parameter is less than a preset value.

If the judgment of Step 104 is positive, Step 105 and Step 106 are carried out. The templates are updated by using the optimization parameter, and the set of the incremental learning samples is updated. Then, the processing of the weak classifying templates is ended.

If the judgment of Step 104 is negative, Step 107 is carried out. The optimization parameter is updated, and then the processing of Step 103, Step 104 and Step 107 is repeated until the judgment of Step 104 is positive.

FIG. 16 shows a flow chart of the incremental learning method of the invention in the mode of literal description. In the flow chart of FIG. 16, the things needing to be interpreted are such that: since the incremental learning samples are samples undetected or wrongly detected, when an optimization increment $\Delta c$ is initially set to zero, the gradient of the hybrid objective loss function will be bigger than a preset threshold. In addition, a symbol $\|g\|_2$ represents the modulus of g.

The following content explains the advantages of the invention by comparing it with a combined learning method.

As stated previously, various online Boosting algorithms are developed and obtained on the basis of discrete AdaBoost, and none of them are able to apply to the continuous AdaBoost algorithm (Vector Boosting algorithm at the time of processing the problems of classification for various categories) of the weak classifiers on the basis of domain partition adopted by the present application. In the offline training process of a face detector, the learning capacity expressed by the continuous AdaBoost algorithm is obviously superior to that of the traditional discrete AdaBoost algorithm. In order to better explain the advantages of the invention, the present application will adopt a combined learning method as a comparing object for the incremental learning method.

Combined learning is a method which combines the offline samples and online samples directly, and orderly retrains each weak classifier in the strong classifiers according to the AdaBoost algorithm. Under the framework of a face detection algorithm in the present application, the combined learning method, which is the same with the incremental learning algorithm, adjusts aggregated look-up-table functions S(z) so as to optimize hybrid objective loss functions (Formula 3) on the premise of keeping a joint domain-partitioning function R(x) unchanged after correcting various likelihood functions according to the online samples. However, the combined learning method needs to preserve all training samples ever used in the offline training process, and the incremental learning method only records weighted marginal distribution on each observed quantity $z_i$. The essential difference causes the two algorithms to adopt different methods in the calculating process of the offline part of the hybrid objective loss functions (Formula 4). The combined learning, like the traditional offline training, adopts a large number of offline samples to simulate likelihood functions corresponding to the offline part, while the incremental learning adopts the Naïve Bayes method to approximately estimate weighted likelihood functions belonging to the offline part through the products of the marginal distribution on each observed quantity $z_i$.

A experiment, taking the detection problem of front erect faces as an example, studies the conditions that the incremental learning algorithm and the combined learning algorithm correct the strong classifier obtained by offline training according to a small number of online face training samples with poor illumination conditions. The samples used for the experiment are shown in the following table 1. We extract 20000 front erect face samples with uniform illumination from the FERET base to represent the face detection problems under general conditions, wherein one half of the samples are used for training, and the other half for test. On the other hand, we select 1425 pictures from a CMU PIE base, and obtain a total of 4275 front erect face samples after appropriate disturbance to them, wherein, 200 samples are used for training, and the rest 4075 samples are used for test. All these face pictures are taken under various extreme illumination conditions, and can represent the problems of face detection under special conditions. Non-face training samples as positive instances are respectively taken from two independent background picture bases, and the quantity corresponds to the quantity of the face samples. Table 1 the example of the offline samples and the online samples (the number in front of the solidus in brackets is the quantity of the samples for training, and the number behind the solidus is the quantity of the samples for test.)

|  | offline samples FERET | online samples CMU PIE |
|---|---|---|
| face | (10000 samples for training/ 10000 samples for test) | (200 samples for training/ 4075 samples for test) |
| non-face | (10000 samples for training/ 10000 samples for test) | (200 samples for training/ 4075 samples for test) |

We obtain a strong classifier including 25 weak classifiers through offline training by adopting the domain-partitioning continuous AdaBoost algorithm. The error rate of the offline test of the strong classifier (the error rate for the offline test samples) is only 0.37%, while the error rate of the online test of the strong classifier (the error rate for the online samples) is as high as 6.27% because the offline training process is influenced by various extreme illumination conditions. In order to more effectively process face detection problems under various special illumination conditions, we respectively adopt the incremental learning method and the combined learning method to correspondingly adjust the strong classifier obtained through offline learning in different reinforce ratios ($\lambda_y=10^n$, n=0, . . . , 8) of the online samples according to online training samples continuously accumulated, and record the changing conditions of the error rates of the offline test and the online test, as shown in FIG. 17.

Figure 17:
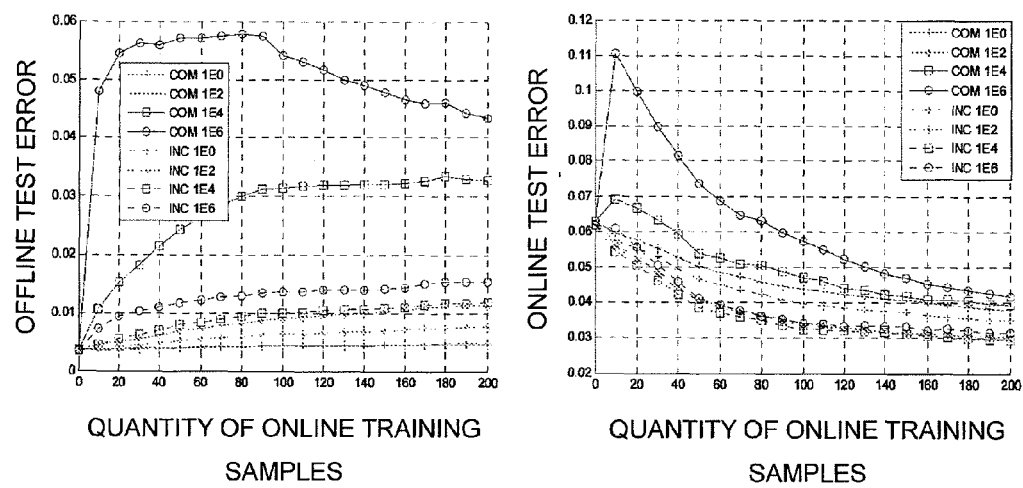
FIG. 17 shows a change conditions of the error rates of the incremental learning algorithm and the combined learning algorithm on offline test samples and online test samples.

In FIG. 17, "COM 1E0" corresponds to the combined learning algorithm as $\lambda_y$ equals to $10^0$, and "INC 1E4" corresponds to the incremental learning algorithm as $\lambda_y$ equals to $10^4$. The horizontal axis represents the quantity of the online training samples adopted by the algorithms, and the longitudinal axis of the left sub-graph and the longitudinal axis of the right sub-graph respectively represent the error rates of the offline test and the online test of the strong classifier. In terms of the integral trend of FIG. 17, along with more and more online samples participating training, both the incremental learning method and the combined learning method can reduce the error rate of the online test of the original strong classifier. Meanwhile, the error rate of the offline test is increased to some extent. Actually, this is not the phenomenon of excessive training but the result that the two learning algorithms newly balance "general conditions" represented by the offline samples and "special conditions" represented by the online samples. Taking the incremental learning method with $\lambda_y=10^2$ as an example, the error rate of the online test of the strong classifier can be reduced to 2.9% from 6.27% only through 200 online training samples, while the error rate of the offline test is only increased to 0.77% from 0.3. In order to cause the detector originally used for processing general problems to well process the face detection problems under special conditions, it is worth exchanging the error rate at this level.

To further study the functions of the reinforce ratio $\lambda_y$ of the online samples in the incremental learning method and the combined learning method, we investigate the influence of the value of $\lambda_y$ on the error rates of the offline test and the online test by "slicing" FIG. 17 on the premise of adopting the same quantity of the online training samples. The experimental result is shown in FIG. 18.

Figure 18:
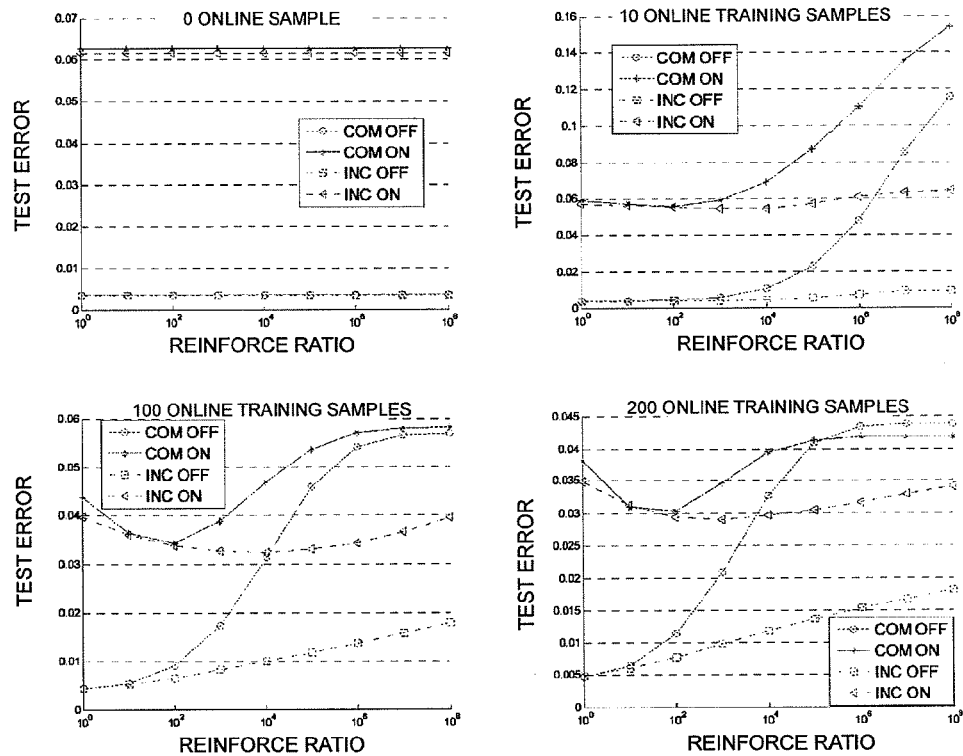
FIG. 18 shows error rates of offline test and online test of the incremental learning method and the combined learning method when the quantities of the on line training samples are respectively 0, 10, 100 and 200.

Four sub-graphs in FIG. 18 from the upper left to the lower right respectively represent the conditions as the quantities of the online training samples are 0, 10, 100 and 200. The horizontal axis in the figure represents the reinforce ratio $\lambda_y$ of the online samples, and the value of $\lambda_y$ is $10^n$, n=0, . . . 8. "COM OFF" represents the error rate of the offline test of the combined learning method, and "INC ON" represents the error rate of the online test of the incremental learning method. By observing the "slicing" results, we discover that although the increase of the reinforce ratio $\lambda_y$ of the online samples, namely the increase of the correction coefficient $\alpha_y$ of the online samples, enables the incremental learning and the combined learning to more focus on the online part of the hybrid objective loss functions, it can not ensure that the error rate of the online test is reduced, on the other hand, it makes the error rate of the offline test always keep raising. The phenomenon is obviously expressed in the combined learning method. Under the condition that the quantity of the online training samples shown in the upper right of FIG. 18 is only 10, when $\lambda_y$ is continuously increased to $10^8$, namely that $\alpha_y$ is gradually close to 1 (the relationship of $\alpha_y$ and $\lambda_y$ can be referred to Formula 30), both the error rates of the offline test and the online test of the combined learning method present obvious upward trends. This is the excessive training phenomenon actually, because the online part dominates in the hybrid objective loss functions although quantity of the online training samples is small.

On the other hand, the inhibiting capacity of the incremental learning method for the excessive training phenomenon in different situations is obviously superior to that of the combined learning method. The basic reason for the difference is that the two methods adopt completely different calculating modes for the offline part of the hybrid objective loss functions. The combined learning method needs to simulate the joint distribution of the likelihood functions in an observation space through the offline training samples at the time of calculating the offline part of the hybrid objective loss functions (Formula 12). Since the dimension of the observation space is usually high (the same as the quantity of the weak classifier), the sampling process is insufficiently enough. When the online part dominates, the strong classifier need to be greatly adjusted in the algorithms to optimize the hybrid objective loss functions. At this time, the insufficient sampling problem of the combined learning method becomes obvious, so that a big error between the calculating result of the offline part of the hybrid objective loss functions and the true value is probably generated. The incremental learning method does not generate an error as big as that generated by the combined learning method because it adopts the Naïve Bayes method to approximate the joint distribution through the products of the marginal distribution of the likelihood functions on each observed quantity that makes the dependency of the incremental learning method on the sample quantity greatly reduced. Actually, the experimental result of FIG. 18 indicates that the incremental learning method is not sensitive to the parameter $\lambda_y$: a random change of $\lambda_y$ within a large range does not greatly influence on the result of the incremental learning. Further more, the incremental learning method represents the performances as good as the combined learning method with respect to either the error rate of the offline test or the error rate of the online test, and the error rate of the incremental learning method is almost always lower than the error rate of the combined learning method or is at an equivalent level at least. Since the combined learning method is used on the premise of storing all offline training samples, the incremental learning method has more advantages.

The upper left sub-graph of FIG. 18 also shows an interesting phenomenon. When the quantity of the online training samples is 0, the error rate of the offline test of the incremental learning method is 0.34%, and the error rate of the online test is 6.18%, and both of them are slightly lower than those of the combined learning method which uses 10000 offline samples for training (respectively 0.37% and 6.27%). Actually, this is caused by that the two learning methods adopt different optimizing strategies. We know that the AdaBoost algorithm is a process using an additive model to gradually optimize objective loss functions actually. Therefore, for the objective loss functions, the strong classifier obtained through the offline training is not the global optimum result. When the quantity of the online training samples is 0, the combined learning method is substantially the AdaBoost algorithm for the offline training, and therefore, the learning result is still the result obtained by gradual optimization. However, the incremental learning algorithm is different. Since it uses a parallelization weak classifier adjusting strategy to obtain the global optimum result of the objective loss functions, the strong classifier obtained through the offline learning can be further optimized by the incremental learning method. This is actually another reason for that the incremental learning method is superior to the combined learning method in the aspect of the error rates of the offline test and the online test.

Figure 19:
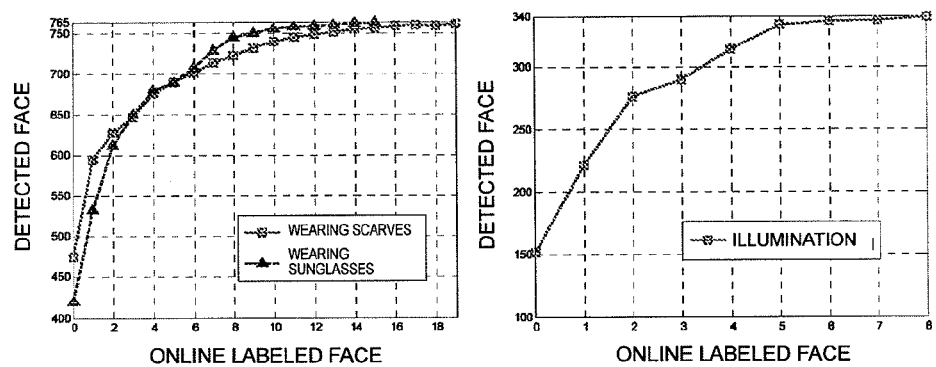
FIG. 19 shows effect of the incremental learning algorithm on helping the detector to solve the face detection problem in special environment.

In addition, to check whether or not the incremental learning algorithm can effectively and appropriately adjust the detector, we select three kinds of face detection problems in special environment and independently test them. Front erect face pictures with sunglasses and front erect face pictures with scarves which are 765 different face pictures and belong to the condition of partially shielding faces are taken from AR bases. Backlighting half side pictures which are 340 different face pictures in total and belong to the condition of extreme poor illumination are taken from CMU PIE bases. The test method simulates operation of general terminal users. If an undetected face in the pictures is labeled, several samples corresponding to it are produced and added to the set of the online training samples, and then the detector is appropriately adjusted by the incremental learning algorithm. Specifically in an experiment, each labeled face is moderately disturbed to produce 16 samples. Since the experiment has proved that the incremental learning process of the strong classifier is not sensitive to the reinforce ratio of the online samples, we directly and experientially select $\lambda_{+1}=16$. As for $\lambda_{-1}$, since the background of the picture set (the AR bases and the CMU PIE bases) adopted by the experiment is very simple, and the wrong detection of the detector can not be collected in the experiment to be used as positive instances for the incremental learning; the value of the reinforce ratio of the online samples of positive instances is not important. The experimental result is shown in FIG. 19, wherein the left sub-graph corresponds to two special conditions (sunglasses and scarves) of the front erect faces in the AR bases, and the right sub-graph corresponds to the backlighting condition of the half side faces in the CMU PIE bases.

Before the online samples are not labeled (corresponding to the condition of 0 on x axis in the drawing), the detection rates of the face detector obtained by the offline training for the three test sets are so unsatisfactory that a large number of face pictures are undetected for each test set. However, after manually labeling 15 undetected face pictures with sunglasses, 19 undetected face pictures w$^{th}$ scarves and 8 undetected face pictures with half side backlighting, we can respectively obtain three face detectors with detection rates of 100% by means of the incremental learning algorithm of the detector. That means the incremental learning algorithm presented by us can effectively adjust the face detector according to a small number of online training samples, and make it rapidly adapt to special application environment.

However, this is not enough we also desire that the detector obtained by the incremental learning maintains capacity for processing face detection problems under general conditions. Therefore, taking the detection problem of front faces with sunglasses as an example, we compare the detectors before and after the incremental learning on the CMU+MIT front face test sets, and obtain the ROC curve comparing results shown in FIG. 20.

Figure 20:
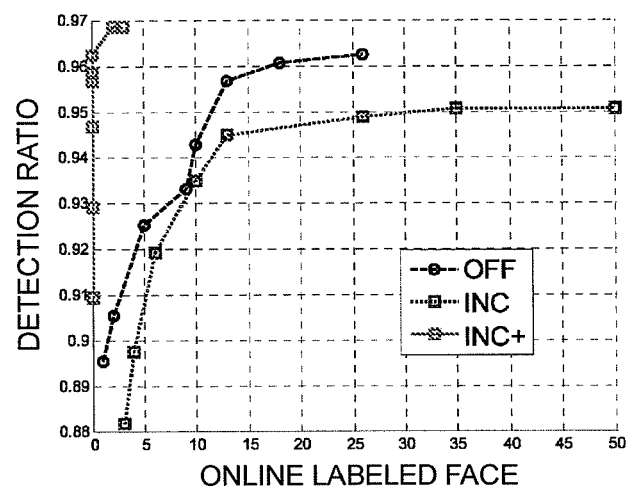
FIG. 20 shows change condition of detection precision of the detector on the face test set at the front side of CMU+MIT before and after incremental learning.

In FIG. 20, "OFF" represents the ROC curve before the incremental learning (namely the result of offline training), and "INC" represents the ROC curve obtained through the CMU+MIT front face test sets irrespective to the training sets after the detection rate of the detector for faces with sunglasses reaches 100%. It is easy to see that when the face detection problems under the general conditions are processed, such as processing the CMU+MIT front face test sets, although the detection rate of the face detector obtained by the incremental learning is slightly lower than that of the face detector obtained by the offline learning, the slight degeneracy is acceptable in consideration of the great difference of the capacities of the detectors before and after the incremental learning in FIG. 19 at the time of processing special environment.

Through thorough analysis, we discover the reason for the precision decrease of the detector after the incremental learning is not the decrease of the detection rate. Under the same detection condition, compared with the detector before the incremental learning, the detector after the incremental learning according to the face samples with sunglasses can detect more difficult faces from the pictures (the block is the result before the incremental learning, and the circle is the result after the incremental learning). The real reason for the precision decrease of the detector is the increase of the wrong detection rate after the incremental learning, and the root of the problem is that the process of the incremental learning for face samples with sunglasses is not involved in non-face training samples at all so that the incremental learning algorithm wrongly causes a part of non-face modes similar to these online training samples to pass through while adjusting the detector to adapt to special face samples. Actually, these wrong detections can be effectively eliminated in the detection process only by collecting the wrong detections caused by the detector and using the data as the non-face online training samples to newly carry out incremental learning for the detector. The "INC+" curve shown in FIG. 20 is just about the result obtained after the new incremental learning. The wrong detection times of this detector are almost always 0 or so. Since the condition of faces with sunglasses is considered in the incremental learning, the detection rate is increased relative to that of the offline training. Therefore, the detector obtained after the new incremental learning is obviously superior to the results of the offline training and the first incremental learning at the aspect of detection precision.

As above mentioned, according to one aspect of the invention, the invention provides a detecting device for specific subjects, which includes an input unit for inputting images to be detected; one or more strong classifying units for carrying out strong classification to the image, wherein each strong classifying unit includes one or more weak classifying units which carries out weak classification to the images to be detected by using weak classifying templates; a storage unit storing the weak classifying templates used by the weak classifying units; and a judging unit which judges whether or not the image contains specific subjects according to the classifying result of the strong classifying units. The detecting device for specific subjects is characterized that it also includes an incremental sample input unit for inputting data for incremental learning, namely inputting incremental learning samples, that is, the data undetected or wrongly detected by the detecting device for specific subjects; a learning unit for updating the weak classifying templates stored in the storage unit according to the incremental learning samples inputted by the incremental sample input unit.

According to another aspect of the invention, the invention provides a learning device for the detecting device for specific subjects. The detecting device for specific subjects includes one or more strong classifying units. Each strong classifying unit includes one or more weak classifying units, which judge whether or not the input images contain the specific subjects by using the weak classifying templates. The learning device updates the weak classifying templates by using the incremental learning samples which are the data undetected or wrongly detected by the detecting device for specific subjects in operation. The learning device includes an optimization level calculating part for calculating the level of optimization of the weak classifying templates with an optimization parameter according to the input incremental learning samples; a judging unit which judges whether or not the optimization of the weak classifying templates with the optimization parameter meets certain conditions according to the calculating result of the optimization level calculating part; an optimization parameter updating unit updating the optimization parameter when the judging unit judges that the optimization of the weak classifying templates with the optimization parameter does not meet certain conditions; a template updating unit updating the weak classifying templates when the judging unit judges that the optimization of the weak classifying templates with the optimization parameter meets certain conditions.

Preferably, each of the weak classifying units includes a subinterval judging unit for classifying input images to be detected to one of many subintervals which are not mutually crossed according to the division of an instance space; a weak classification determining unit for outputting the prediction result of the classification of the images to be detected according to the judging result of the subinterval judging unit and the subinterval weak classifying templates. The storage unit stores the subinterval weak classifying templates, and the learning unit updates the each subinterval weak classifying template stored in the storage unit according to the incremental learning samples inputted by the incremental sample input unit.

Preferably, the learning unit includes an optimization level calculating part for calculating the level of optimization of the subinterval weak classifying templates with an optimization parameter according to the input incremental learning samples; a judging unit which judges whether or not the optimization of the subinterval weak classifying templates with the optimization parameter meets certain conditions according to the calculating result of the optimization level calculating part; an optimization parameter updating unit updating the optimization parameter when the judging unit judges that the optimization of the weak classifying templates with the optimization parameter does not meet certain conditions; a template updating unit updating the weak classifying templates when the judging unit judges that the optimization of the weak classifying templates with the optimization parameter meets certain conditions.

Preferably, the optimization level calculating part includes a correction coefficient determining unit for determining the correction coefficient of the incremental learning samples; a first objective loss calculating unit for calculating a first objective loss caused by the optimization of the subinterval weak classifying templates with the optimization parameter; a second objective loss calculating unit for calculating a second objective loss caused by the optimization of the subinterval weak classifying templates with the optimization parameter according to the input incremental learning samples; an optimization level calculating unit for calculating the level of the optimization of the weak classifying templates with the optimization parameter according to the first objective loss calculated by the first objective loss calculating unit, the second objective loss calculated by the second objective loss calculating unit and the correction coefficient of the incremental samples determined by the correction coefficient determining unit.

Preferably, the optimization level calculating unit includes a first multiplication part, a second multiplication part, a first derivation part, a second derivation part and an addition part, wherein the first multiplication part is used for multiplying the difference between 1 and the correction coefficient by the first objective loss; the second multiplication part is used for multiplying the correction coefficient by the second objective loss; the first derivation part is used for carrying out derivation for the multiplication result of the first multiplication part; the second derivation part is used for carrying out derivation for the multiplication result of the second multiplication part; the addition part is used for adding the derivation result of the first derivation part to the derivation result of the second derivation part.

Preferably, the optimization level calculating unit includes a first multiplication part, a second multiplication part, an addition part and a derivation part, wherein the first multiplication part is used for multiplying the difference between 1 and the correction coefficient by the first objective loss; the second multiplication part is used for multiplying the correction coefficient by the second objective loss; the addition part is used for adding the derivation result of the first derivation part to the derivation result of the second derivation part; the derivation part is used for carrying out derivation for the addition result of the addition part.

Preferably, the correction coefficient determining unit determines the correction coefficient according to the quantity of the online samples so that the function of the incremental learning samples is not influenced by the change of the total quantity of the incremental learning samples.

Preferably, the learning unit also includes an incremental learning sample updating unit which is used for reducing the incremental learning samples in the set including the incremental learning samples to obtain a new set of the incremental learning samples.

Preferably, the first objective loss calculating unit calculates the first objective loss by using the Naïve Bayes method.

Preferably, the optimization parameter updating unit updates the optimization parameter according to the 0.618 method.

Preferably, the subinterval judging unit firstly extracts the characters of the images to be detected, and then classifies the images to be detected to a certain subinterval in the instance space in the mode of the equal interval division of piecewise functions.

Preferably, the incremental learning samples are images undetected or wrongly detected by the detecting device for specific subjects in operation; the incremental sample input unit includes a recording unit used for recording the images undetected or wrongly detected by the detecting device for specific subjects in operation.

Preferably, the incremental learning samples are images undetected or wrongly detected by other detecting devices for specific subjects other than the detecting device for specific subjects in operation, wherein other detecting devices for specific subjects are the same as the detecting device for specific subjects. The incremental sample input unit includes a receiving unit for receiving the images undetected or wrongly detected by other detecting devices for specific subjects in operation.

Wherein, the specific subjects are faces.

Wherein, one or more strong classifying units are connected with each other in a waterfall mode or a vector tree mode.

Preferably, the detecting device for specific subjects includes a switching device which is used for switching the mode states of the detecting device for specific subjects so that the detecting device for specific subjects is switched between the detection mode and the learning mode. The incremental sample input unit and the learning unit work when the detecting device for specific subjects is switched to the learning mode by the switching device.

According to another aspect of the invention, the invention provides a learning method for the detecting device for specific subjects. The detecting device for specific subjects includes one or more strong classifying units, and each of the strong classifying units includes one or more weak classifying units which judge whether or not the input images contain specific subjects by using the weak classifying templates. Aiming at each weak classifier, the learning method includes an input step for inputting the incremental learning samples; an optimization level obtaining step for calculating the level of the optimization of the weak classifying templates with the optimization parameter according to the input incremental learning samples which are the data undetected or wrongly detected by the detecting device for specific subjects in operation; a judging step for judging whether or not the optimization of the weak classifying templates with the optimization parameter meets certain conditions according to the calculating result of the optimization level obtaining step; an optimization parameter updating step which updates the optimization parameter when the judging step judges that the optimization of the weak classifying templates with the optimization parameter does not meet certain conditions; a template updating step which updates the weak classifying templates when the judging step judges that the optimization of the weak classifying templates with the optimization parameter meets certain conditions.

Preferably, the optimization level obtaining step includes a correction coefficient determining step for determining the correction coefficient of the incremental learning samples; a first objective loss calculating step for calculating the first objective loss caused by the optimization of the weak classifying templates with the optimization parameter; a second objective loss calculating unit for calculating the second objective loss caused by the optimization of the weak classifying templates with the optimization parameter according to the input incremental learning samples; an optimization level calculating step for calculating the level of the optimization of the weak classifying templates with the optimization parameter according to the first objective loss calculated by the first objective loss calculating unit, the second objective loss calculated by the second objective loss calculating step and the correction coefficient of the incremental samples determined by the correction coefficient determining step.

Preferably, the optimization level calculating step includes a first multiplication step, a second multiplication step, a first derivation step, a second derivation step and an addition step, wherein the first multiplication step is used for multiplying the difference between 1 and the correction coefficient by the first objective loss; the second multiplication step is used for multiplying the correction coefficient by the second objective loss; the first derivation step is used for carrying out derivation for the multiplication result of the first multiplication step; the second derivation step is used for carrying out derivation for the multiplication result of the second multiplication step; the addition step is used for adding the derivation result of the first derivation step to the derivation result of the second derivation step.

Preferably, the optimization level calculating step includes a first multiplication step, a second multiplication step, an addition step and a derivation step, wherein the first multiplication step is used for multiplying the difference between 1 and the correction coefficient by the first objective loss; the second multiplication step is used for multiplying the correction coefficient by the second objective loss; the addition step is used for adding the multiplication result of the first multiplication step to the multiplication result of the second multiplication step; the derivation step is used for carrying out derivation for the addition result of the addition step.

Preferably, the correction coefficient determining step is used for determining the correction coefficient according to the quantity of the online samples so that the function of the incremental learning samples is not influenced by the change of the total quantity of the incremental learning samples.

Preferably, the learning method also includes an incremental learning sample updating step used for reducing the incremental learning samples in the set including the incremental learning samples to obtain a new set of the incremental learning samples.

Preferably, the first objective loss calculating step calculates the first objective loss with a marginal distribution function method or the Naïve Bayes method.

Wherein, the weak classifying unit includes a subinterval judging unit for classifying input images to be detected to one of many subintervals which are not crossed mutually according to the division of the instance space; a weak classification determining unit for outputting the prediction result of the classification of the images to be detected according to the judging result of the subinterval judging unit and the subinterval weak classifying templates. The learning method is used for updating each of the subinterval weak classifying templates according to the incremental learning samples.

Preferably, the optimization parameter updating unit is used for updating the optimization parameter according to the 0.618 method.

Wherein, the incremental learning samples are the images undetected or wrongly detected by the detecting device for specific subjects in operation, or the images undetected or wrongly detected by other detecting devices for specific subjects other than the detecting device for specific subjects in operation, wherein other detecting devices for specific subjects are the same as the detecting device for specific subjects.

Wherein, the specific subjects are faces.

In addition, according to another aspect of the invention, the present invention provides a computer program which can cause a computer to be used as the detecting device for specific subjects to work when it is executed by the computer.

In addition, according to another aspect of the invention, the invention provides a computer program which can cause a computer to be used as the learning device to work when the computer program is executed by the computer.

In addition, according to another aspect of the invention, the invention provides a computer program which can cause a computer to realize the learning method when the computer program is executed by the computer.

In addition, according to another aspect of the invention, the invention provides a computer readable storage medium for storing the computer program which can cause a computer to work as the detecting device for specific subjects.

In addition, according to another aspect of the invention, the invention provides a computer readable storage medium for storing the computer program which can cause a computer to work as the learning device.

In addition, according to another aspect of the invention, the invention provides a computer readable storage medium for storing the computer program which can cause a computer to realize the learning method.

The computer storage media can be any computer readable storage media known by technicians in the field, such as floppy disks, DVD, VCD, CD, disks, hard disks, Flash, magnetic-optical disks and the like.

The following content lists associated references which are helpful for understanding the invention, and the associated references are incorporated in the present application through citation, and are like complete elucidation in the present application.

[1] R. E. Schapire and Y. Singer. Improved Boosting Algorithms Using Confidence-rated Predictions. In: Machine Learning, vol. 37, pp. 297-336, 1999.
[2] V. N. Vapnik. The nature of statistical learning theory. Berlin, Germany: Springer-Verlag, 1995.
[3] J. Friedman, T. Hastie, and R. Tibshirani. Additive logistic regression: A statistical view of boosting. In: Annals of Statistics, vol. 28, pp. 337-374, 2000.
[4] P. Utgoff, N. Berkman, and J. Clouse. Decision tree induction based on efficient tree restructuring. In: Machine Learning, 29(1), 5-44. 1997.
[5] N. Littlestone. Learning quickly when irrelevant attributes abound: A new linear threshold algorithm. In: Machine Learning, 2, 285-318. 1988.
[6] N. Littlestone, and M. Warmuth. The weighted majority algorithm. In: Information and Computation, 108, 212-261. 1994.
[7] L. Breiman. Pasting small votes for classification in large databases and on-line. In: Machine Learning, 36, 85-103. 1999.
[8] A. Fern and R. Givan. Online ensemble learning: An empirical study. In: Proc. ICML, pp. 151279-286, 2000.
[9] N. Oza and S. Russel. Online bagging and boosting. In: Proc. Artificial Intelligence and Statistics, 2001.
[10] N. Oza. Online ensemble learning. Ph.D. thesis, University of California, Berkeley, 2001.
[11] O. Javed, S. Ali, and M. Shah. Online detection and classification of moving objects using progressively improving detectors. In: Proc. CVPR, 2005.
[12] H. Grabner and H. Bischof. Online Boosting and Vision. In: Proc. CVPR, 2006.
[13] R. O. Duda, P. E. Hart, and D. G Stork. Pattern Classification, 3S Second Edition. John Wiley & Sons, Inc. pp 62-64, 2001.
[14] T. Sim, S. Baker, and M. Bsat. The CMU pose, illumination, and expression database. IEEE Trans. PAMI, 25(12), 1615-1618, 2003.

The invention claimed is:

1. A detecting device for specific subjects, comprising:
an input unit for inputting images to be detected;
one or more strong classifying units for carrying out strong classification to the images to be detected, each of which includes one or more weak classifying units for carrying out weak classification to the images to be detected by using a weak classifying template, wherein the weak classifying template is a classification table or a function that defines a relationship between predetermined subintervals and weak classifications, and wherein the weak classifying unit maps the input image to one of the predetermined subintervals based on a feature extracted from the input image and determines a specific weak classification that corresponds to the predetermined subinterval that is the mapping result by using the classification table or the function;
a storage unit storing the weak classifying template which is used by the weak classifying unit;
a judging unit judging whether or not the images to be detected contains the specific subjects according to the classification result of the strong classifying unit; wherein
the detecting device for specific subjects also includes:
an incremental sample input unit for inputting data for incremental learning, namely for inputting an incremental learning sample, that is to say the incremental learning sample is the undetected and wrongly detected data of the detecting device or other detecting devices for specific subjects;
a learning unit for updating the weak classifying template stored in the storage unit according to the incremental learning sample inputted by the incremental sample input unit.

2. The detecting device for specific subjects according to claim 1, wherein
the weak classifying unit includes a subinterval judging unit for classifying the input images to be detected to some subinterval in several subintervals which are not mutually crossed according to the division of an instance space; a weak classification determining unit for outputting the prediction result of classification of the images to be detected according to the judging result of the subinterval judging unit and according to subinterval weak classifying templates; wherein the storage unit stores all the subinterval weak classifying templates;

the learning unit updates each subinterval weak classifying template stored in the storage unit according to the incremental learning sample inputted by the incremental sample input unit.

3. The detecting device for specific subjects according to claim 2, wherein the learning unit includes an optimum degree calculating part for calculating an optimum degree of optimization of the subinterval weak classifying templates with an optimization parameter according to the input incremental learning sample;

a judging unit judging whether or not the optimization of the subinterval weak classifying templates with the optimization parameter meets a certain condition according to the calculation result of the optimum degree calculating part;

an optimization parameter updating unit updating the optimization parameter when the judging unit judges that the optimization of the weak classifying templates with the optimization parameter does not meet a certain condition; and a template updating unit updating the weak classifying templates when the judging unit judges that the optimization of the weak classifying templates with the optimization parameter meets a certain condition.

4. The detecting device for specific subjects according to claim 3, wherein the optimum degree calculating part includes a correction coefficient determining unit for determining a correction coefficient of the incremental learning samples;

a first objective loss calculating unit for calculating a first objective loss caused by optimization of the subinterval weak classifying templates with the optimization parameter;

a second objective loss calculating unit for calculating a second objective loss caused by optimization of the subinterval weak classifying templates with the optimization parameter according to the input incremental learning sample;

an optimum degree calculating unit for calculating an optimum degree of optimization of the weak classifying templates with the optimization parameter according to the first objective loss calculated by the first objective loss calculating unit, the second objective loss calculated by the second objective loss calculating unit and the correction coefficient of incremental samples, which is determined by the correction coefficient determining unit.

5. The detecting device for specific subjects according to claim 4, wherein the optimum degree calculating unit includes a first multiplication part, a second multiplication part, a first derivation part, a second derivation part and an addition part, wherein the first multiplication part is used for multiplying the difference between 1 and the correction coefficient by the first objective loss;

the second multiplication part is used for multiplying the correction coefficient by the second objective loss;

the first derivation part is used for carrying out derivation for the multiplication result of the first multiplication part;

the second derivation part is used for carrying out derivation for the multiplication result of the second multiplication part;

the addition part is used for adding the derivation result of the first derivation part and the derivation result of the second derivation part.

6. The detecting device for specific subjects according to claim 4, wherein the optimum degree calculating unit includes a first multiplication part, a second multiplication part, an addition part and a derivation part, wherein the first multiplication part is used for multiplying the difference between 1 and the correction coefficient by the first objective loss;

the second multiplication part is used for multiplying the correction coefficient by the second objective loss;

the addition part is used for adding the multiplication result of the first multiplication part and the multiplication result of the second multiplication part;

the derivation part is used for carrying out derivation for the addition result of the addition part.

7. The detecting device for specific subjects according to claim 4, wherein the correction coefficient determining unit determines the correction coefficient according to the quantity of the online samples so that a function of the incremental learning samples is not influenced by the change of the total quantity of the incremental learning samples.

8. The detecting device for specific subjects according to claim 4, wherein the first objective loss calculating unit calculates the first objective loss with a Naïve Bayes method.

9. The detecting device for specific subjects according to claim 3, wherein the learning unit also includes an incremental learning sample updating unit which is used for reducing the incremental learning samples in the set including the incremental learning samples to obtain a new set of the incremental learning samples.

10. The detecting device for specific subjects according to claim 3, wherein the optimization parameter updating unit updates the optimization parameter according to the 0.618 optimization method.

11. The detecting device for specific subjects according to claim 2, wherein the subinterval judging unit firstly extracts the characters of the images to be detected, and then classifies the images to be detected to a certain subinterval in the instance space according to the mode of the equal interval division of piecewise functions.

12. The detecting device for specific subjects according to claim 1, wherein the incremental learning samples are images undetected or wrongly detected by the detecting device for specific subjects in operation; wherein the incremental sample input unit includes a recording unit used for recording the images undetected or wrongly detected by the detecting device for specific subjects in operation.

13. The detecting device for specific subjects according to claim 1, wherein the incremental learning samples are images undetected or wrongly detected by other detecting devices for specific subjects other than the detecting device for specific subjects in operation, wherein the other detecting devices for specific subjects are the same as the detecting device for specific subjects, the incremental sample input unit includes a receiving unit for receiving the images undetected or wrongly detected by the other detecting devices for specific subjects in operation.

14. The detecting device for specific subjects according to claim 1, wherein the specific subjects are faces.

15. The detecting device for specific subjects according to claim 1, wherein the one or more strong classifying units are connected with each other in a waterfall mode or a vector tree mode.

16. The detecting device for specific subjects according to claim 1, wherein the detecting device for specific subjects includes a switching device which is used for switching the mode states of the detecting device for specific subjects so that the detecting device for specific subjects is switched between the detection mode and the learning mode;
the incremental sample input unit and the learning unit work when the detecting device for specific subjects is switched to the learning mode by the switching device.

17. A learning method for a detecting device for specific subjects, wherein the detecting device for specific subjects includes one or more strong classifying units which include one or more weak classifying units for judging whether or not input images contain the specific subjects by using weak classifying templates, wherein the weak classifying templates are each a classification table or a function that defines a relationship between predetermined subintervals and weak classifications, and wherein the weak classifying unit maps the input image to one of the predetermined subintervals based on a feature extracted from the input image and determines a specific weak classification that corresponds to the predetermined subinterval that is the mapping result by using the classification table or the function, the learning method implemented on a microprocessor and including for each weak classifying unit:
an input step for inputting incremental learning samples;
an optimization level obtaining step for calculating the level of optimization of the weak classifying templates with an optimization parameter according to the input incremental learning samples which are data undetected or wrongly detected by the detecting device for specific subjects or other detecting devices for specific subjects in operation;
a judging step for judging whether or not optimization of the weak classifying templates with the optimization parameter meets certain conditions according to a calculating result of the optimization level obtaining step;
an optimization parameter updating step which updates the optimization parameter when the judging step judges that the optimization of the weak classifying templates with the optimization parameter does not meet certain conditions; and
a template updating step which updates the weak classifying templates when the judging step judges that the optimization of the weak classifying templates with the optimization parameter meets certain conditions.

18. The learning method according to claim 17, wherein the optimization level obtaining step includes
a correction coefficient determining step for determining a correction coefficient of the incremental learning samples;
a first objective loss calculating step for calculating a first objective loss caused by the optimization of the weak classifying templates with the optimization parameter;
a second objective loss calculating unit for calculating a second objective loss caused by the optimization of the weak classifying templates with the optimization parameter according to the input incremental learning samples;
an optimization level calculating step for calculating the level of optimization of the weak classifying templates with the optimization parameter according to the first objective loss calculated by the first objective loss calculating step, the second objective loss calculated by the second objective loss calculating step and the correction coefficient of the incremental samples determined by the correction coefficient determining step.

19. The learning method according to claim 18, wherein the optimization level calculating step includes a first multiplication step, a second multiplication step, a first derivation step, a second derivation step and an addition step, wherein
the first multiplication step is used for multiplying a difference between 1 and the correction coefficient by the first objective loss;
the second multiplication step is used for multiplying the correction coefficient by the second objective loss;
the first derivation step is used for carrying out derivation for the multiplication result of the first multiplication step;
the second derivation step is used for carrying out derivation for the multiplication result of the second multiplication step; and
the addition step is used for adding the derivation result of the first derivation step to the derivation result of the second derivation step.

20. The learning method according to claim 18, wherein the optimization level calculating step includes a first multiplication step, a second multiplication step, an addition step and a derivation step, wherein
the first multiplication step is used for multiplying a difference between 1 and the correction coefficient by the first objective loss;
the second multiplication step is used for multiplying the correction coefficient by the second objective loss;
the addition step is used for adding the derivation result of the first multiplication step to the derivation result of the second multiplication step; and
the derivation step is used for carrying out derivation for the addition result of the addition step.

21. The learning method according to claim 18, wherein the correction coefficient determining step determines the correction coefficient according to a quantity of online samples so that a function of the incremental learning samples is not influenced by a change of the total quantity of the incremental learning samples.

22. The learning method according to claim 18, wherein the first objective loss calculating step calculates the first objective loss with a marginal distribution function method or a Naïve Bayes method.

23. The learning method according to claim 17, wherein the learning method also includes an incremental learning sample updating step used for reducing the incremental learning samples in the set comprising the incremental learning samples to obtain a new set of the incremental learning samples.

24. The learning method according to claim 17, wherein
the weak classifying unit includes a subinterval judging unit for classifying input images to be detected to one of many subintervals which are not crossed mutually according to the division of an instance space; a weak classification determining unit for outputting a prediction result of the classification of the images to be detected according to the judging result of the subinterval judging unit and the subinterval weak classifying templates, wherein
the learning method updates the subinterval weak classifying templates according to the incremental learning samples.

25. The learning method according to claim 17, wherein the optimization parameter updating step updates the optimization parameter with the 0.618 optimization method.

26. The learning method according to claim 17, wherein the incremental learning samples are the images undetected or wrongly detected by the detecting device for specific subjects in operation, or the images undetected or wrongly detected by other detecting devices for specific subjects other than the detecting device for specific subjects in operation, wherein the other detecting devices for specific subjects are the same as the detecting device for specific subjects.

27. The learning method according to claim 17, wherein the specific subjects are faces.

* * * * *

UNITED STATES PATENT AND TRADEMARK OFFICE
CERTIFICATE OF CORRECTION

PATENT NO. : 8,457,391 B2  Page 1 of 1
APPLICATION NO. : 12/602635
DATED : June 4, 2013
INVENTOR(S) : Ai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 655 days.

Signed and Sealed this
Eighth Day of September, 2015

Michelle K. Lee
*Director of the United States Patent and Trademark Office*